US012759213B2

(12) United States Patent
Mondini

(10) Patent No.: US 12,759,213 B2
(45) Date of Patent: Oct. 13, 2026

(54) APPARATUS FOR SKIN APPLICATION OF A THERMOFORMABLE FILM TO A SUPPORT

(71) Applicant: G. MONDINI S.P.A., Cologne (IT)

(72) Inventor: Paolo Carlo Mondini, Cologne (IT)

(73) Assignee: G.MONDINI S.P.A., Cologne (IT)

( * ) Notice: Subject to any disclaimer, the term of this patent is extended or adjusted under 35 U.S.C. 154(b) by 55 days.

(21) Appl. No.: 18/737,040

(22) Filed: Jun. 7, 2024

(65) Prior Publication Data

US 2024/0408809 A1 Dec. 12, 2024

(30) Foreign Application Priority Data

Jun. 8, 2023 (IT) ........................ 102023000011787

(51) Int. Cl.

| | |
|---|---|
| ***B29C 51/32*** | (2006.01) |
| ***B29C 51/10*** | (2006.01) |
| ***B29C 51/16*** | (2006.01) |
| ***B29C 51/26*** | (2006.01) |
| ***B29C 51/38*** | (2006.01) |
| ***B29C 51/42*** | (2006.01) |
| ***B29C 51/44*** | (2006.01) |
| *B29L 31/00* | (2006.01) |

(52) U.S. Cl.

CPC .............. *B29C 51/16* (2013.01); *B29C 51/10* (2013.01); *B29C 51/268* (2013.01); *B29C 51/32* (2013.01); *B29C 51/38* (2013.01); *B29C 51/42* (2013.01); *B29C 51/445* (2013.01); *B29L 2031/712* (2013.01)

(58) Field of Classification Search

CPC ......... B29C 51/10; B29C 51/12; B29C 51/32; B29C 51/36; B29C 51/421; B29C 51/267

See application file for complete search history.

(56) References Cited

U.S. PATENT DOCUMENTS

| | | | | |
|---|---|---|---|---|
| 3,755,522 | A * | 8/1973 | Jope et al. | B29C 51/085 425/388 |
| 4,304,747 | A * | 12/1981 | Lake | B29C 51/32 264/156 |
| 6,367,361 | B1 * | 4/2002 | Christensen | B29C 51/08 264/163 |

FOREIGN PATENT DOCUMENTS

| | | |
|---|---|---|
| DE | 102013010221 | 12/2014 |
| EP | 3235741 | * 10/2017 |

OTHER PUBLICATIONS

Italian Search Report and Written Opinion issued in Italian Application No. 102023000011787 on Jan. 16, 2024, 9 pages.

* cited by examiner

*Primary Examiner* — Edmund H Lee

(74) *Attorney, Agent, or Firm* — Chrisman Gallo Tochtrop LLC

(57) ABSTRACT

An apparatus for skin application of a thermoformable film (9) to a support (3), comprising a supporting element (4), defining a working chamber (6) for receiving a support (3), and a closing element (5), which has a lower heating face (8). The supporting element (4) and the closing element (5) are movable between a home position, in which the working chamber (6) is open, and a working position, in which the upper opening (7) is completely closed by the lower heating face (8). The supporting element (4) comprises a housing portion (15), defining a housing (19) for the support (3), a distancing portion (16), between the housing portion (15) and the upper opening (7) and defining a distancing space (21) interposed between the housing (19) and the upper opening (7), and cutting means (23) which surround the housing (19).

16 Claims, 25 Drawing Sheets

APPARATUS FOR SKIN APPLICATION OF A THERMOFORMABLE FILM TO A SUPPORT

The present invention relates to an apparatus and a method for skin application of a thermoformable film to a support. The present invention is preferably developed for skin packaging of products, especially for fresh food products such as meat, cheese, etc. Nevertheless, the present invention can also be applied in the case of products of different types such as non-food sector products such as, for example, household and personal care products. As is known, "skin packaging" refers to the application of a protective thermoformable film on a support and on a product placed on the support, thus obtaining a pack in which the product is placed between the support and the thermoformable film essentially in a vacuum and is sealed relative to the external environment. Skin packaging is performed by heating the thermoformable film so that it becomes deformable and adhering it to the support and to the product by creating a vacuum as if it were an upper "skin" of the pack. In the packaging industry, and particularly in food packaging, skin packaging is one of the most well-known and widely used types of packaging. Although the thermoformable film is generally a plastic film, it is still possible for the thermoformable film to be a laminated film and/or a multilayer film and/or a film that includes materials other than a plastic film.

With reference to skin packaging, currently known apparatuses comprise a supporting element and a closing element. In general, the supporting element defines a housing, open at the top, to accommodate the support on which the product is placed. The closing element, on the other hand, has a heating surface configured to heat the film, thus making it easily deformable. The supporting element and the closing element are movable relative to each other between a home position, in which the two elements are spaced apart and the housing is open to allow the insertion and/or withdrawal of the support from the housing, and a working position, in which the two elements are coupled together and the housing is closed at the top by the heating surface. When the supporting element and the closing element are in the working position, these two elements define a sealed chamber within which a vacuum is created to apply the thermoformable film to the product and to the support, making it adhere to both. The closing element comprises suction elements that are configured to suck the thermoformable film toward the heating surface.

The heating surface of the closing element is substantially "dome" shaped, with the concavity facing the housing. Such domed shape of the lower heating surface is adopted so that the thermoformable film can also be applied to products that project upward from the respective support (that is, projecting products).

In these apparatuses, the heated thermoformable film is initially deformed upward to bring it into contact with the heating surface starting from a condition in which it is flat (after being unwound from the reel and/or after being cut into sheets), and causing it to take on the shape of the heating surface. This deformation is sometimes performed cold, that is with the thermoformable film not having been previously heated.

Some apparatuses for skin packaging on the market are configured to operate with only one type of support and/or product. In these apparatuses, there is therefore no possibility to make a format change, which significantly reduces its operational flexibility. The term "format change," as is known, refers to the replacement of components of an apparatus in such a way that different types of supports and/or products can be processed. In particular, the format change makes it possible to work both on different materials of supports (for example, plastic, cellulose-based material, metal such as aluminium, etc.) and on supports and/or products of different heights and/or dimensions.

Nevertheless, types of apparatuses exist which do, on the other hand, enable a format change to be made. However, in these apparatuses, the format change is performed through a complex process, which requires many steps and the replacement of many elements of the apparatus. Indeed, it is necessary to replace both components that are part of the closing element, in particular components related to the heating surface (e.g. for increasing or decreasing the curvature of the heating surface), and components that are part of the supporting element, in particular components that are related to the housing, such for it to be made suitable to receive supports of different types and to be able to package products of different types.

In this context, the technical purpose of the present invention is to make an apparatus and implement a method for the skin application of a thermoformable film to a support which offer a solution to the drawbacks mentioned above.

In particular, the technical purposes of the present invention is to make an apparatus and implement a method for the skin application of a thermoformable film to a support that make it possible to package a projecting product and to obtain a pack of a quality at least equal to or better than the quality of packs obtained using the known apparatuses.

Another technical purpose of the present invention is to make an apparatus and implement a method for the skin application of a thermoformable film to a support that make it possible to operate a format change more quickly and easily than the known apparatuses.

The technical purpose and the aims indicated above are substantially achieved by an apparatus and a method for skin application of a thermoformable film to a support in accordance with the contents of the accompanying independent claims. The particular embodiments of the present invention are defined in the dependent claims.

Further features and the advantages of the present invention will become more apparent after a careful reading of the detailed description of several preferred, non-limiting embodiments of an apparatus and a method for skin application of a thermoformable film to a support, as shown in the accompanying drawings, in which.

Figure 1:
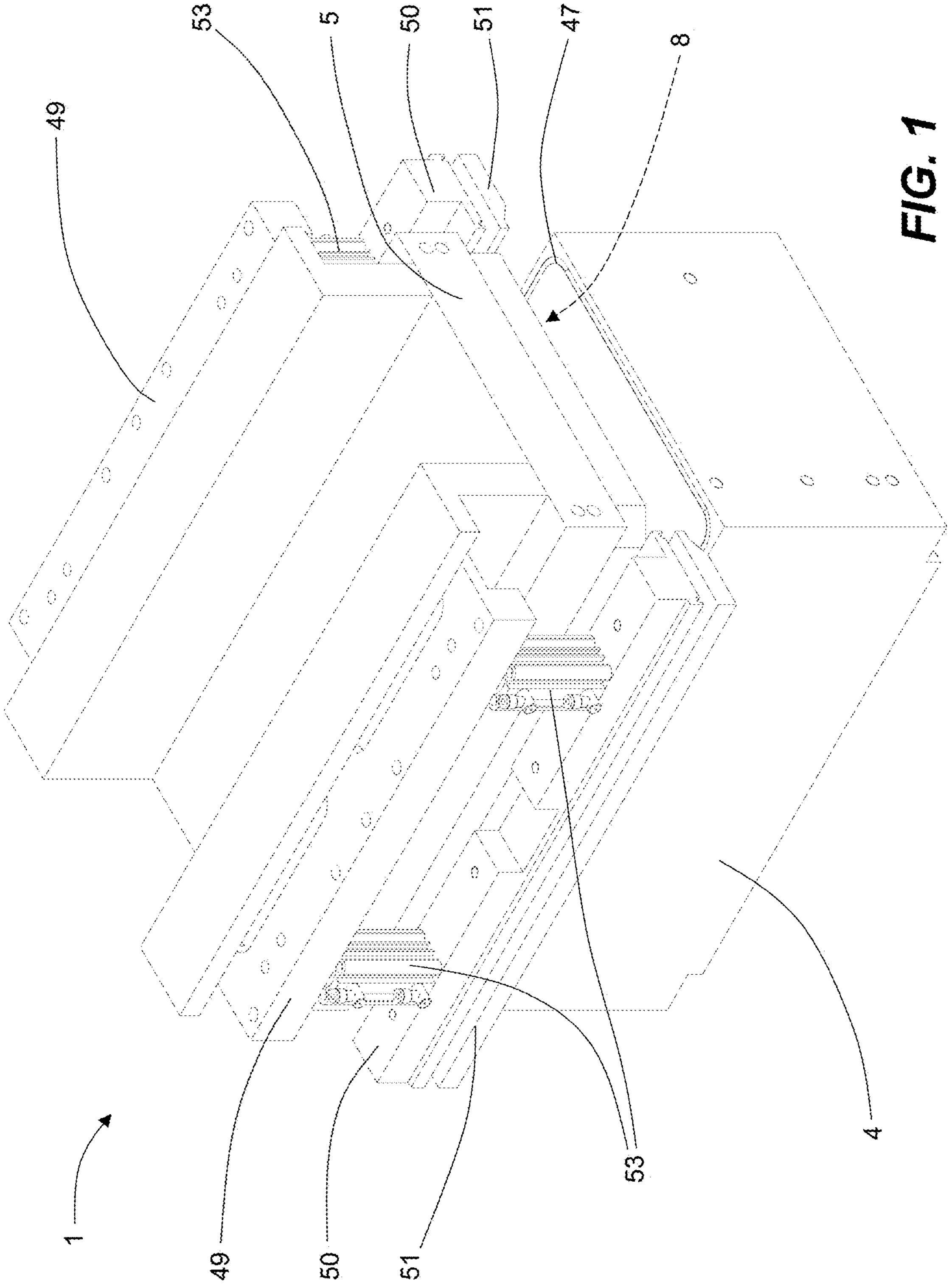
FIG. 1 shows an axonometric view of a first embodiment of an apparatus for skin application of a thermoformable skin to a support, according to the present invention.

The following detailed description will first describe the apparatus for skin application of a thermoformable film to a support according to the present invention, followed by the method for skin application of the thermoformable film to the support according to the present invention.

The following description with reference to the apparatus and with reference to the method must be understood to also apply with reference to the method and with reference to the apparatus, respectively, if technically compatible. The apparatus 1 described in the present invention is an apparatus for skin application of a thermoformable film 9 to a support 3.

The present invention has been developed advantageously for the skin packaging of a product 2. For this reason, the following will mainly refer to the apparatus 1 for skin packaging of the product 2. However, it bears highlighting that the present invention can also be applied for the coating of a support 3 with the thermoformable film 9.

The apparatus 1 is advantageously applied in the case where the product 2 is a food product and where the support 3 has a tray shape, but it should not be considered limited to this type of application.

Indeed, firstly, the present invention can be applied in the case of a product 2 of a type other than a food product such as, for example, household and personal care products.

Secondly, the present invention is not limited either by the shape of the support 3, which can for example be flat, or by the type of the support 3, which can be coloured, transparent, with writing, etc., or by the material the support 3 is made of, which can be plastic, a cellulose based material, a multilayered material (for example, outer paper with inner plastic liner), etc.

The apparatus 1 described in the present invention (shown in FIG. 1), as with the known apparatuses, comprises a supporting element 4 and a closing element 5, which are advantageously mounted on a supporting frame (not shown in the accompanying). The supporting element 4 is configured to receive the support 3 and defines a working chamber 6 which has an upper opening 7. One embodiment of the supporting element 4 is shown in FIG. 2, in which the working chamber 6 and the upper opening 7 are clearly visible. The closing element 5, on the other hand, has a lower heating face 8 configured to heat the thermoformable film 9. In the preferred embodiments, as in the first embodiment, the lower heating face 8 is completely flat. However, embodiments are possible in which the lower heating face 8 is concave or convex.

Figure 6:
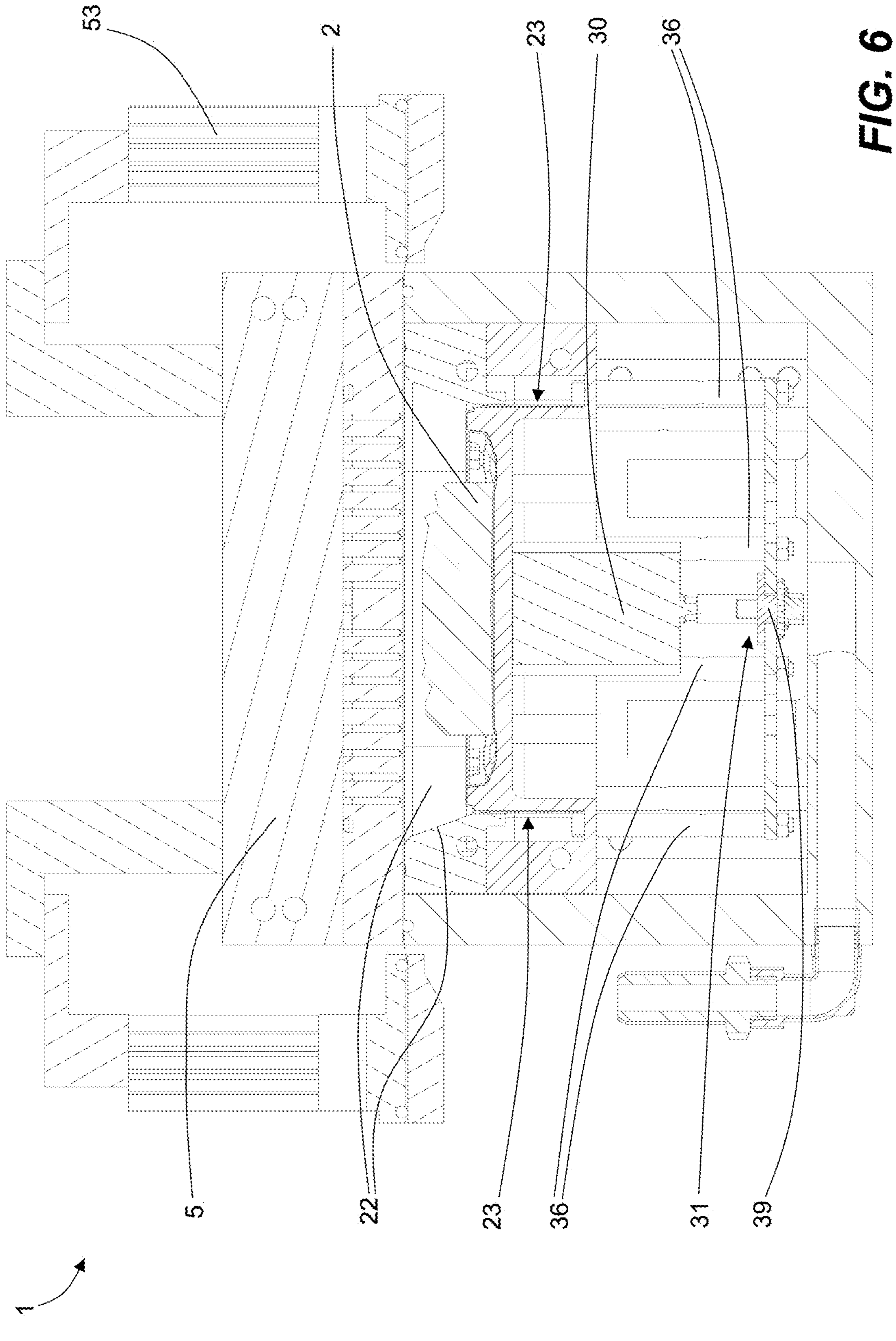
FIG. 6 shows the apparatus in FIG. 5 with the supporting element and the closing element in a working position.
Figure 7:
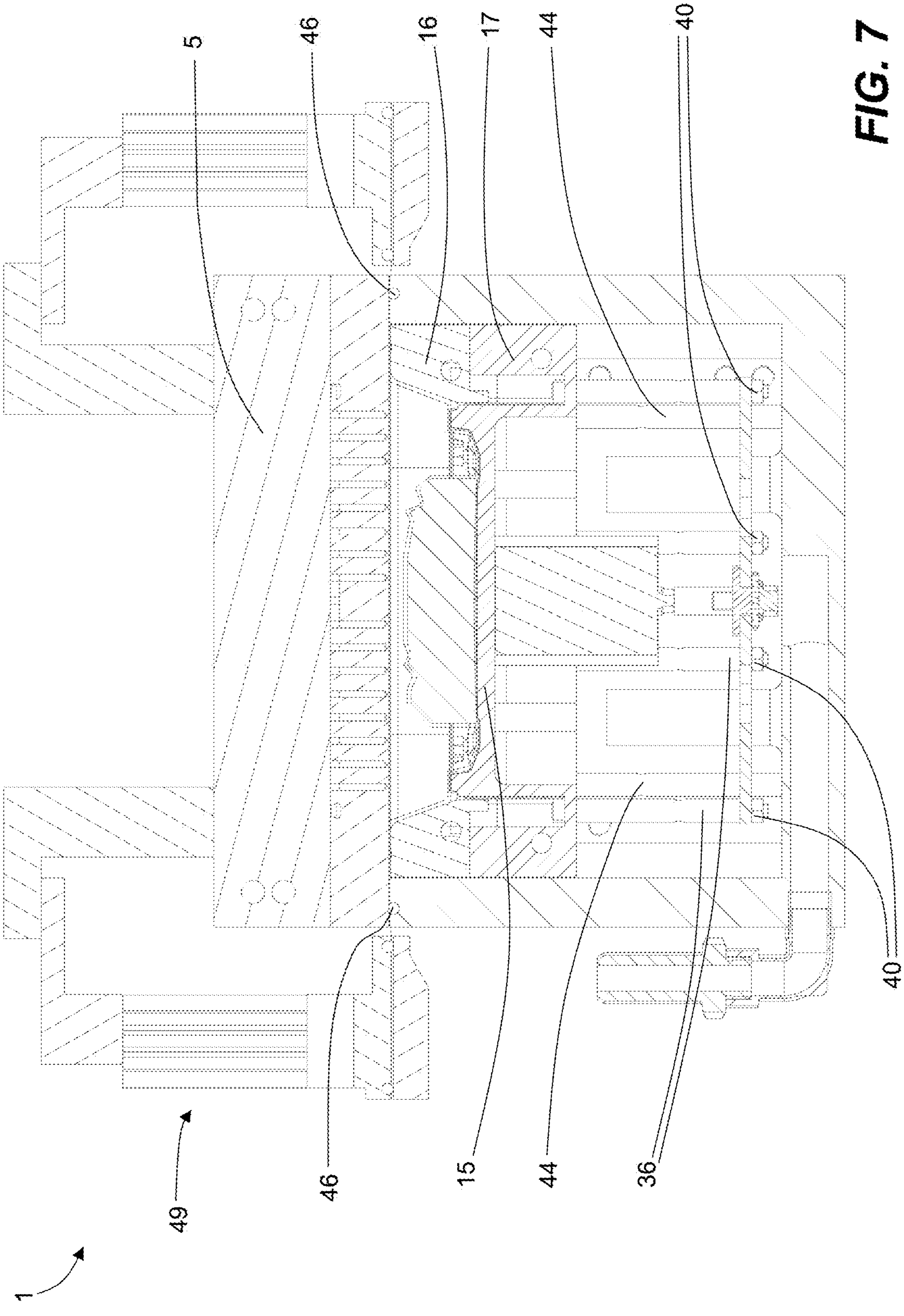
FIG. 7 shows the apparatus in FIG. 6 with the thermoformable film thermoformed on the product and on the support and with cutting means in a lowered position.

The supporting element 4 and the closing element 5 are movable, at least one relative to the other, between a home position and a working position. In the home position (shown in FIGS. 3 to 5), the supporting element 4 and the closing element 5 are uncoupled and spaced apart from each other and the working chamber 6 is open. This enables the user to access the working chamber 6 both to insert the support 3 in the working chamber 6 and/or to remove the support 3 or the finished pack 10 (the word "pack" meaning either the combination of support 3 and product 2, with the product 2 positioned on the support 3, on which the thermoformable film 9 has been applied, or only the support 3 on which the thermoformable film 9 has been applied) from the working chamber 6, and potentially to position the product 2 on the support 3. In the working position (shown in FIGS. 6 to 8), on the other hand, the supporting element 4 and the closing element 5 are coupled to each other and the upper opening 7 is completely closed by the lower heating face 8. Advantageously, when the supporting element 4 and the closing element 5 are in the working position, the lower heating face 8 closes the working chamber 6 fluid-tight relative to the external environment, so that a vacuum can be created in it to apply the thermoformable film 9 to the support 3, and possibly to the product 2, thus obtaining the pack 10. For this purpose, the apparatus 1 comprises means for creating the vacuum 11, which are associated with the supporting element 4 and which are configured to generate the vacuum in the working chamber 6 when the supporting element 4 and the closing element 5 are in the working position and to cause in use adhesion of the thermoformable film 9 to the support 3, and possibly to the product 2.

Figure 17:
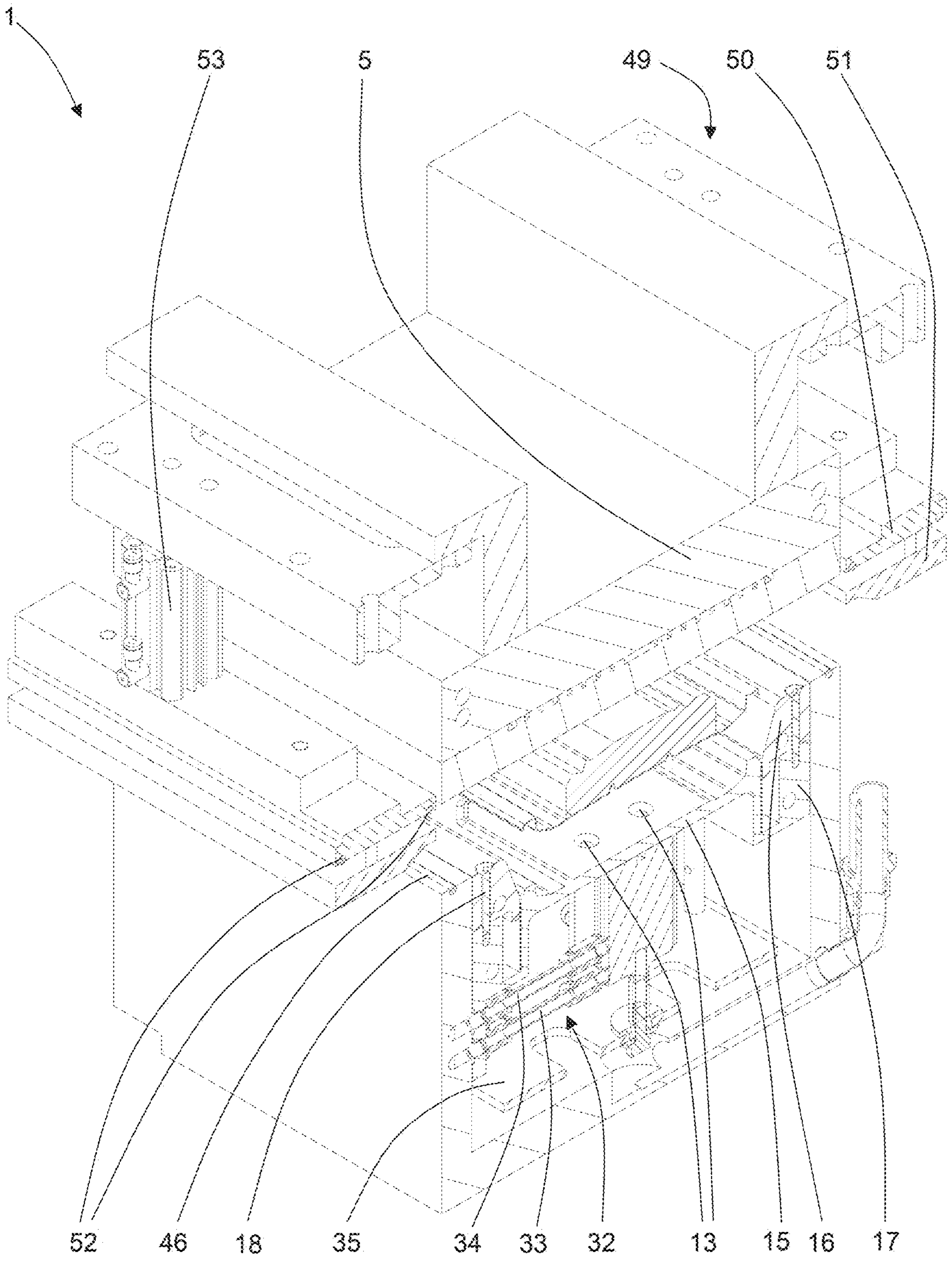
FIG. 17 shows a vertically-sectioned axonometric view of a third vertical section of the apparatus in FIG. 1.

Advantageously, the means for creating the vacuum 11 are configured to generate the vacuum inside the working chamber 6, when the supporting element 4 and the closing element 5 are in the working position, by means of slits 24, which will be described in detail below, which fluid connects the means for creating the vacuum 11 and the working chamber 6, as can be seen in FIG. 17.

In greater detail, in the first embodiment shown in Figures, the means for creating the vacuum 11 are configured to generate the vacuum inside the working chamber 6, when the supporting element 4 and the closing element 5 are in the working position, by the generation of the vacuum inside a receiving seat 12, which will also be described in detail below. In this embodiment, the slits 24 fluidly connect the receiving seat 12 with the working chamber 6.

Further aspects closely related to the means for creating the vacuum 11 are known to a person skilled in the art and, for this reason, will not be further described in detail.

Figure 3:
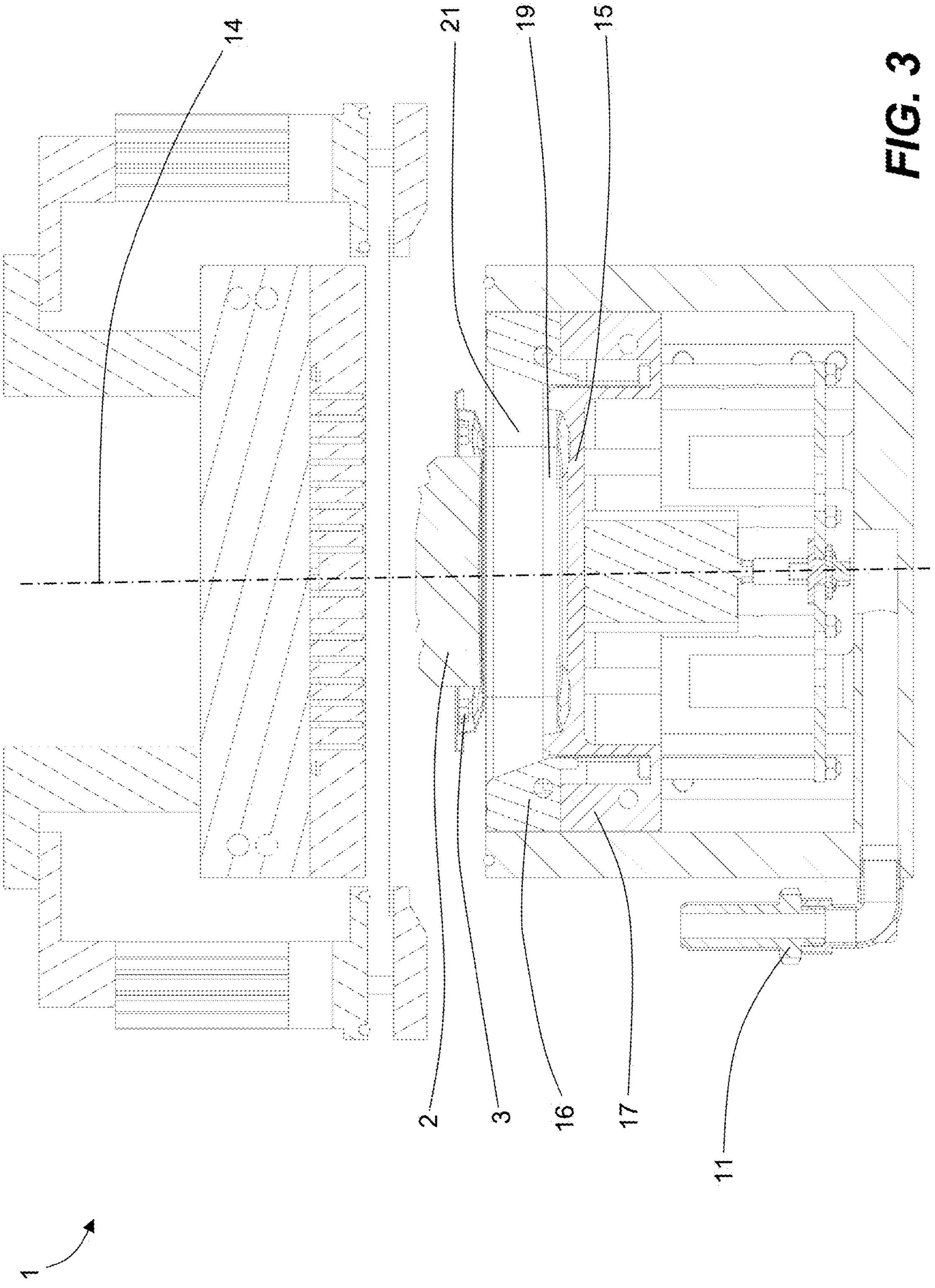
FIG. 3 shows a vertically-sectioned front view of the apparatus in FIG. 1 with the supporting element and a closing element in a home position and with the support outside of a housing.
Figure 4:
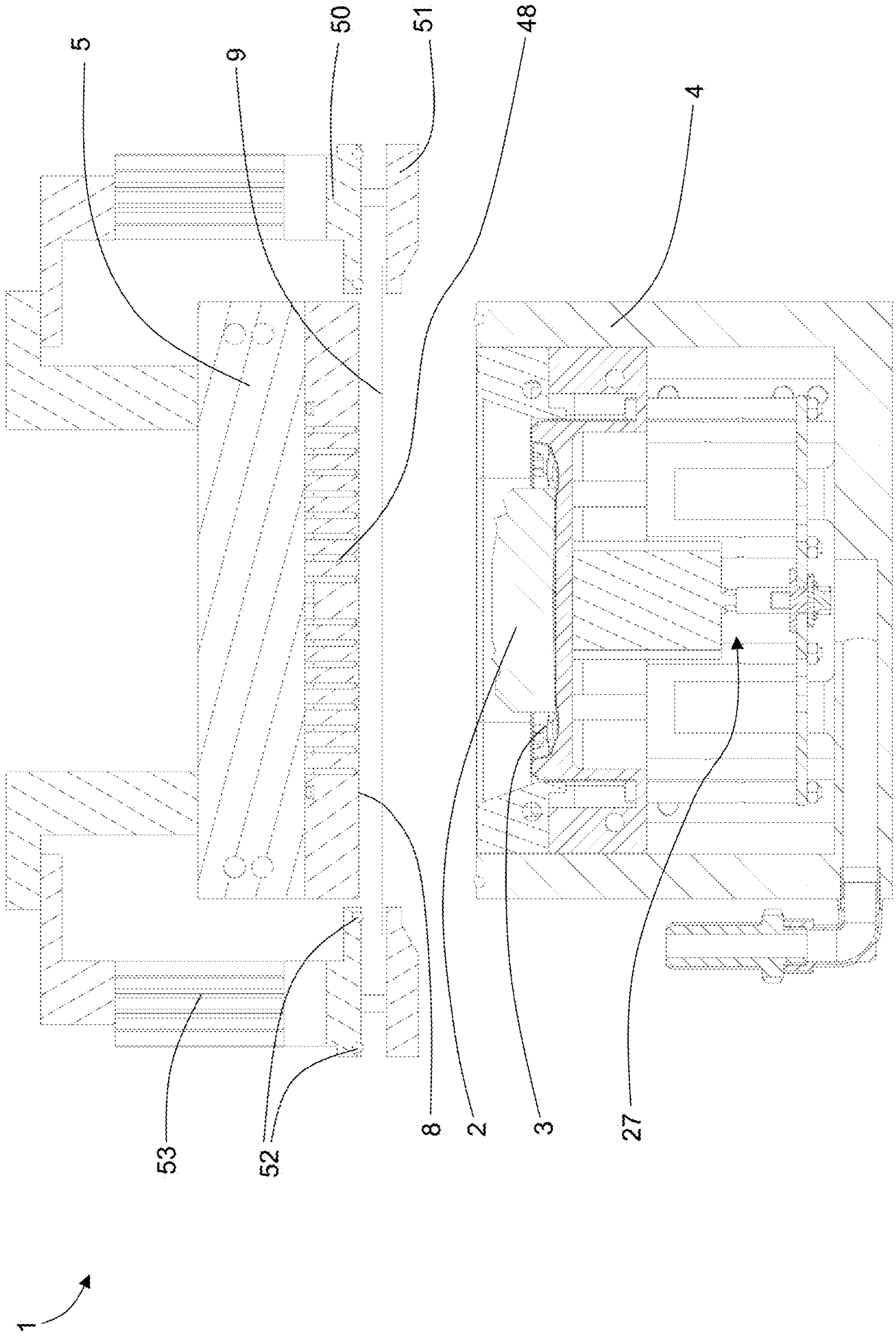
FIG. 4 shows the apparatus in FIG. 3 with the support in the housing and with a retaining device in an opening configuration.

The present invention is not limited by the respective type of movement relative to the supporting element 4 and the closing element 5. Indeed, it is possible for one of the supporting element 4 and closing element 5 to be fixed and stationary relative to the supporting frame and the other to be movable relative to the supporting frame, or for both the supporting element 4 and closing element 5 to be movable relative to the supporting frame. Advantageously, the respective movement between the supporting element 4 and the closing element 5 occurs along a line of movement 14 which, in the preferred embodiments such as that shown in the attached drawings, is rectilinear. Specifically, the line of movement 14 is shown in FIG. 3. In addition, in the embodiments in which the lower heating face 8 is completely flat, the line of movement 14 is preferably perpendicular to the lower heating face 8. Advantageously, this line of movement 14 is arranged vertically. In these embodiments, the closing element 5 is advantageously placed above the supporting element 4 at the working chamber 6.

However, other embodiments are possible in which the movement occurs in a different way, such as, for example, by rotating one element relative to the other (for example, as in the embodiments in which the supporting element 4 and the closing element 5 are hinged to each other).

The supporting element 4 will now be described in greater detail.

Figure 18:
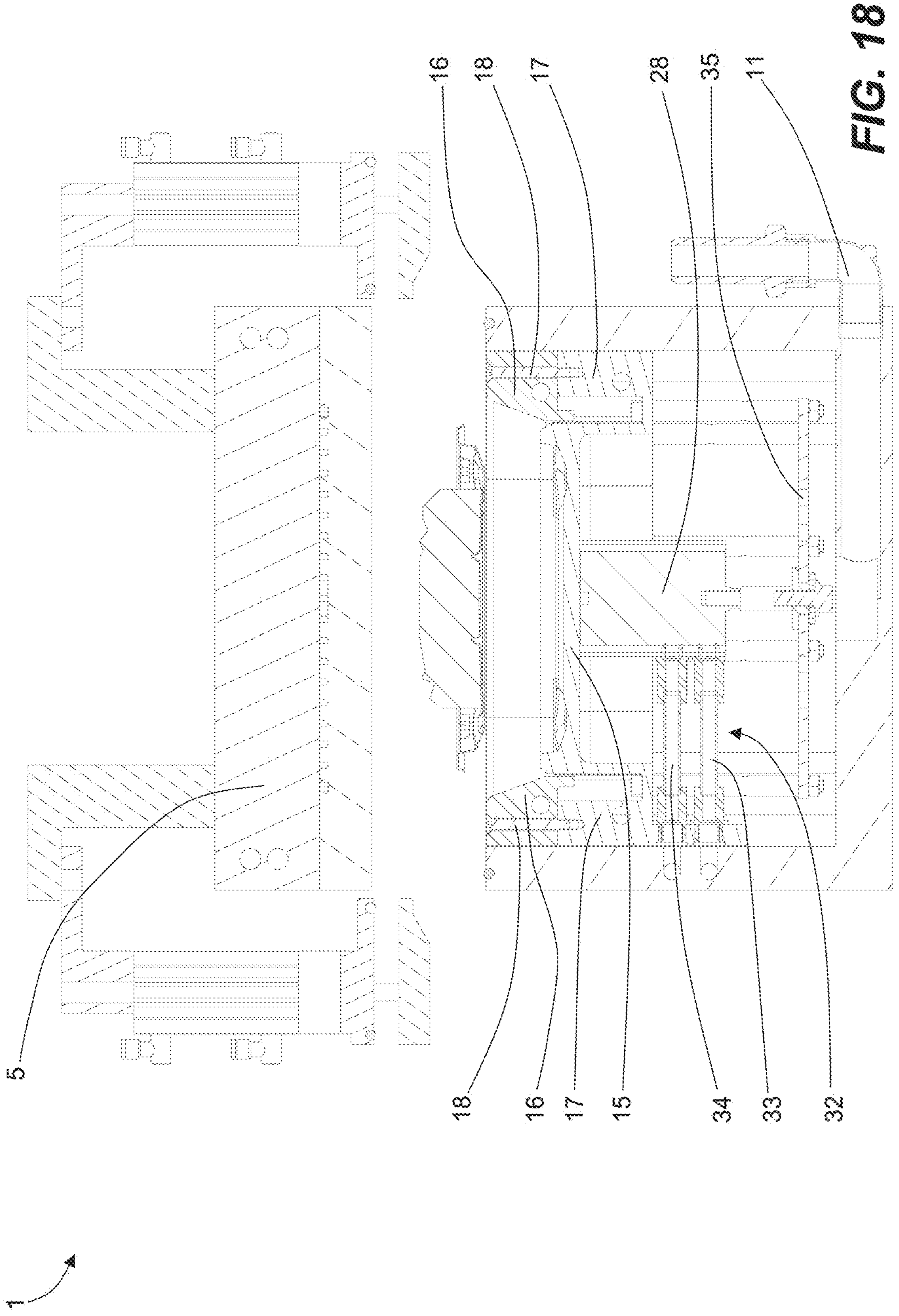
FIG. 18 shows a front view of the third vertical section in FIG. 17.

First, according to a first innovative aspect, the supporting element 4 comprises a housing portion 15 and a distancing portion 16 that are advantageously integral to each other. For this purpose, in the embodiments shown, the supporting element 4 also comprises a fastening portion 17 that is preferably made of the same piece as the housing portion 15, with the distancing portion 16 being directly fastened to the fastening portion 17. In greater detail, the fastening portion 17 and the distancing portion 16 are fixed by means of the first fastening means 18 (clearly visible in FIGS. 17 and 18). In other embodiments, the fastening portion 17 and the distancing portion 16 can be fixed to each other in another way, for instance welded or made from the same piece. Therefore, embodiments are possible in which the supporting element 4 does not comprise the fastening portion 17 and wherein the housing portion 15 is directly fixed to the distancing portion 16.

The housing portion 15 defines a housing 19, which is configured to receive the support 3 and which is advantageously shaped to correspond with the support 3 to be received. The housing 19 has a base surface 20 that is configured to come into contact with the bottom wall of the support 3 when the latter is positioned inside the housing 19 itself. As is clearly visible in FIG. 2, coupling holes 13 are made in the base surface 20 to allow a first actuator 28 to be fixed to the housing portion 15 (the base surface 20 of the housing preferably corresponds to the base of the working chamber 6).

The distancing portion 16, on the other hand, is placed between the housing portion 15 and the upper opening 7 and defines a distancing space 21 that is interposed between the housing 19 and the upper opening 7 (these positions should be understood to mean along the abovementioned vertical line of movement 14). Furthermore, the housing 19 and the distancing space 21 are advantageously part of the working chamber 6 and preferably jointly define the working chamber 6. In the embodiments illustrated, the working chamber 6 is preferably delimited at the bottom by the housing portion 15 and at the side partly by the housing portion 15 and partly by the distancing portion 16. In other words, the distancing portion 16 substantially works as a distancer between the housing portion 15 and the lower heating face 8, when the supporting element 4 and the closing element 5 are in the working position. The presence of the distancing portion 16, and therefore of the distancing space 21, advantageously also enables the machining of a product 2 that extends outside the housing 19, occupying part of the distancing space 21 without coming into contact with the lower heating face 8 (understood to mean the interposition of the thermoformable film 9 between the lower heating face 8 and the product 2).

Advantageously, the distancing portion 16 develops continuously about the housing portion 15 essentially defining an annular frame, as clearly visible from FIG. 2 (in planes perpendicular to the line of movement 14 shown in the accompanying drawings). In addition, the distancing portion 16 has inner walls 22 which are inclined relative to a horizontal reference plane and which converge moving away from the lower heating face 8. Preferably, in embodiments in which the lower heating face 8 is completely flat, the inner walls 22 are inclined relative to such lower heating face 8 when the supporting element 4 and the closing element 5 are in the working position, such as to converge moving away from the lower heating face 8. This facilitates the removal, at the end of each working cycle, of the thermoformable film 9 which during the skin application is applied on the distancing portion 16, as described in more detail below.

Figure 12:
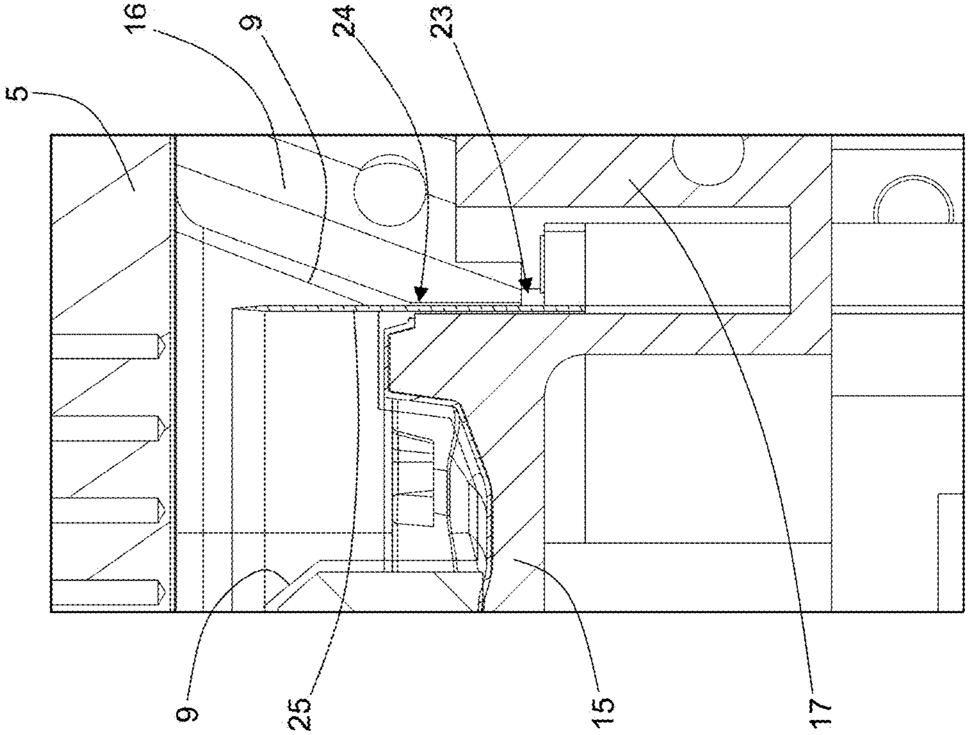
FIGS. 11 and 12 show, enlarged, a detail of FIG. 7 and of FIG. 8, respectively.
Figure 11:
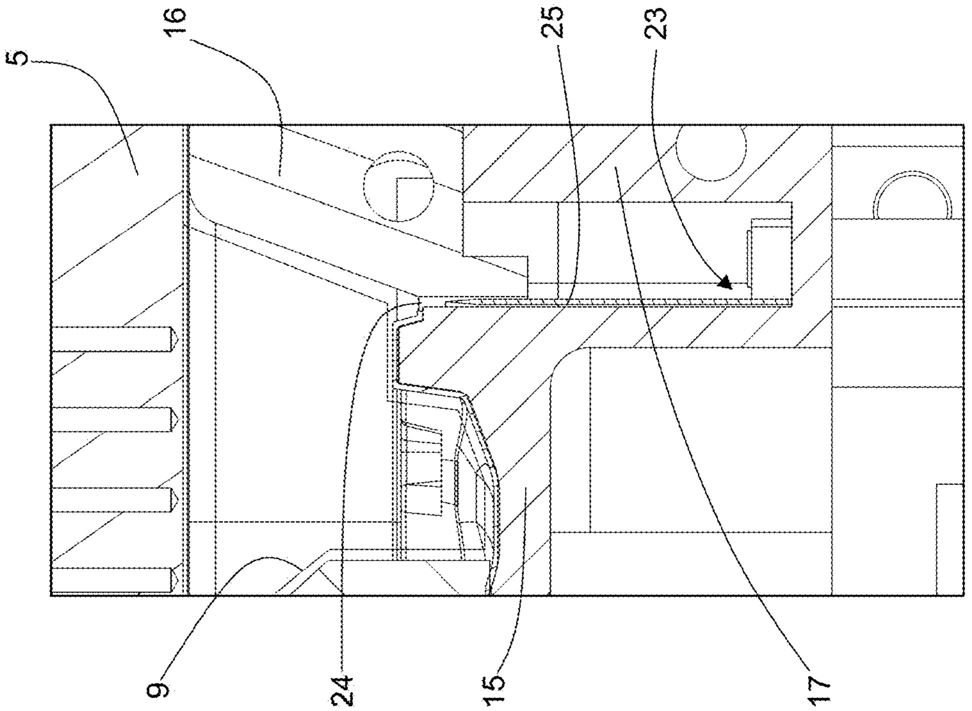
Figure 13:
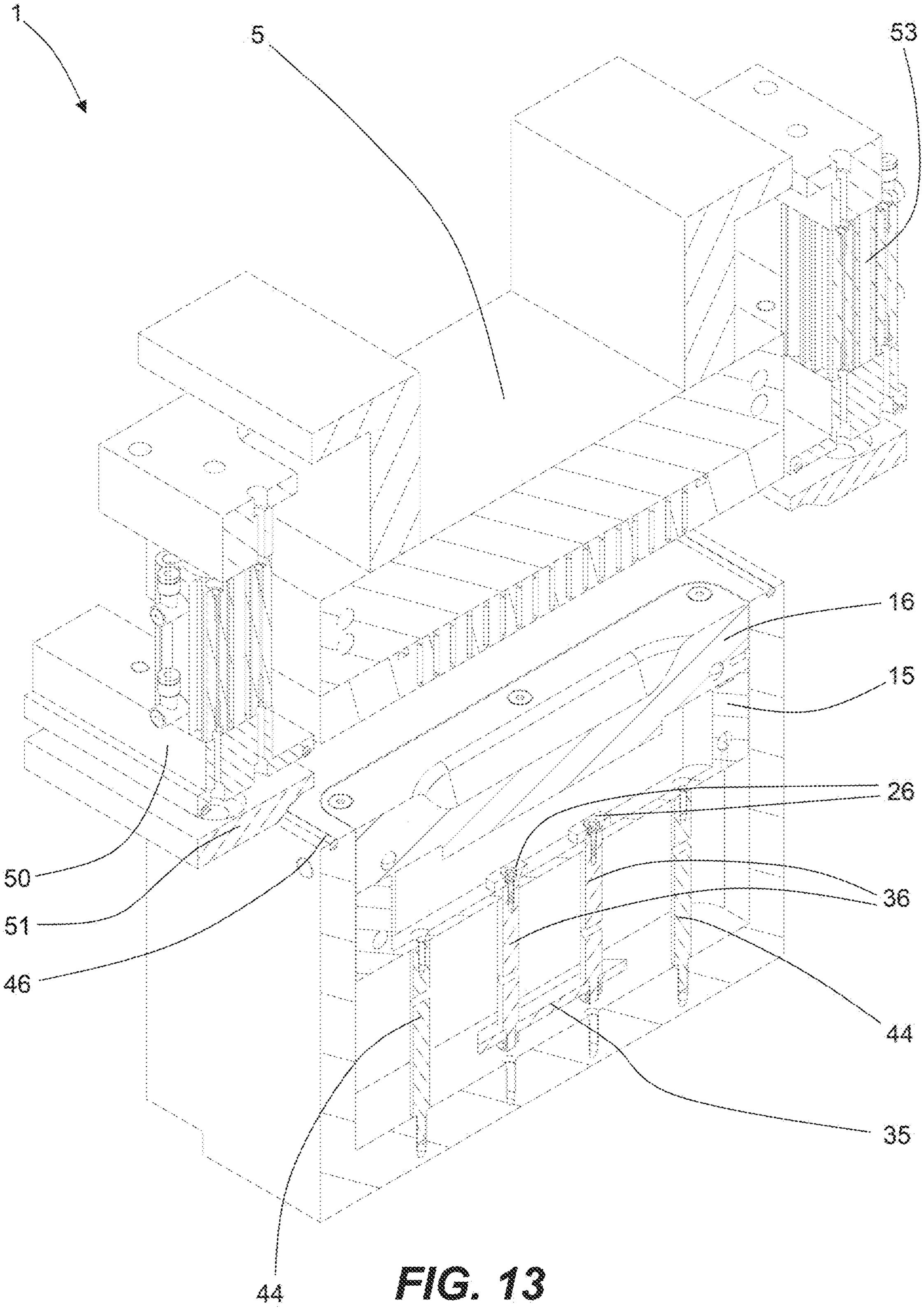
FIG. 13 shows a vertically-sectioned axonometric view of a first vertical section of the apparatus in FIG. 1.
Figure 14:
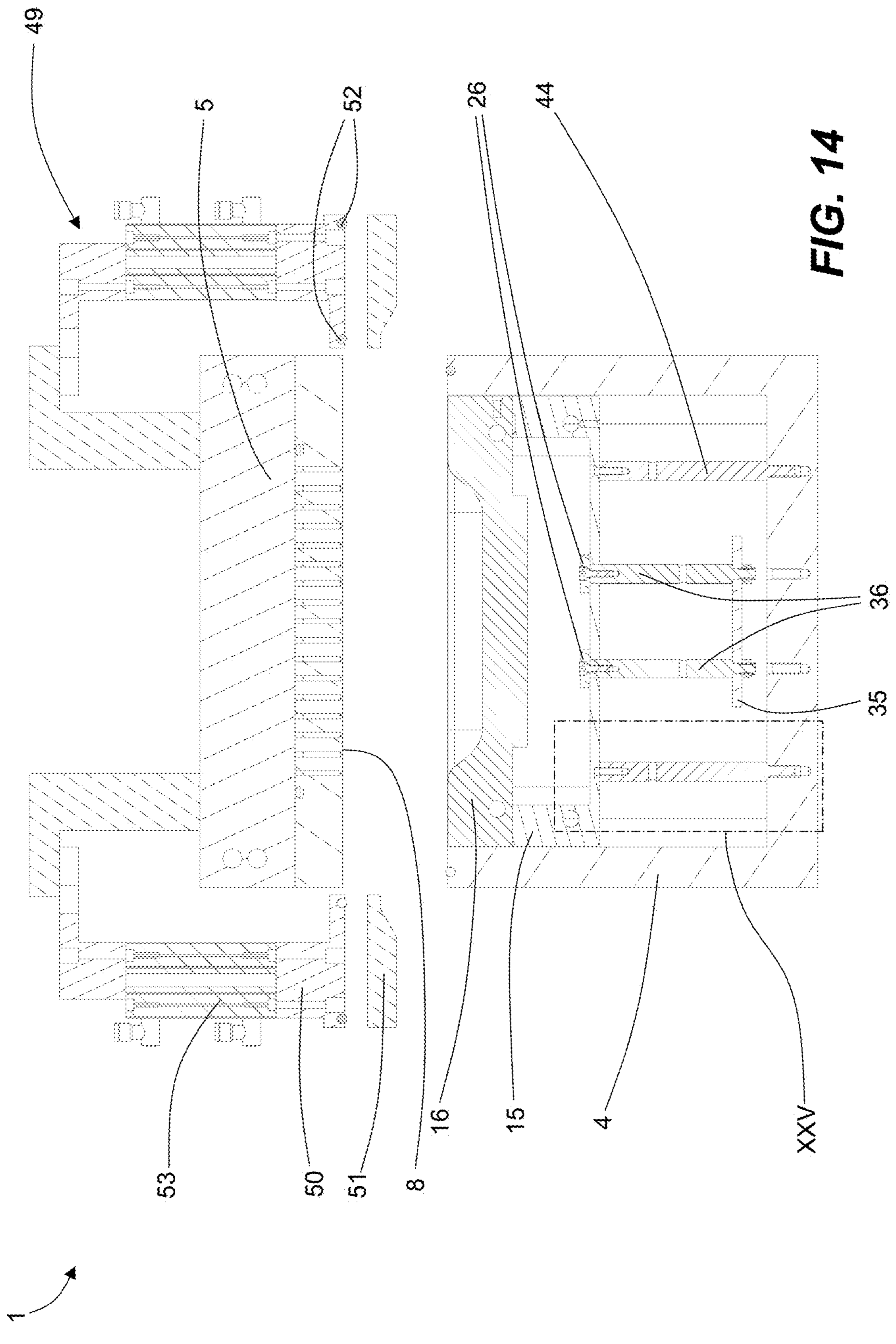
FIG. 14 shows a front view of the first vertical section in FIG. 13.
Figure 15:
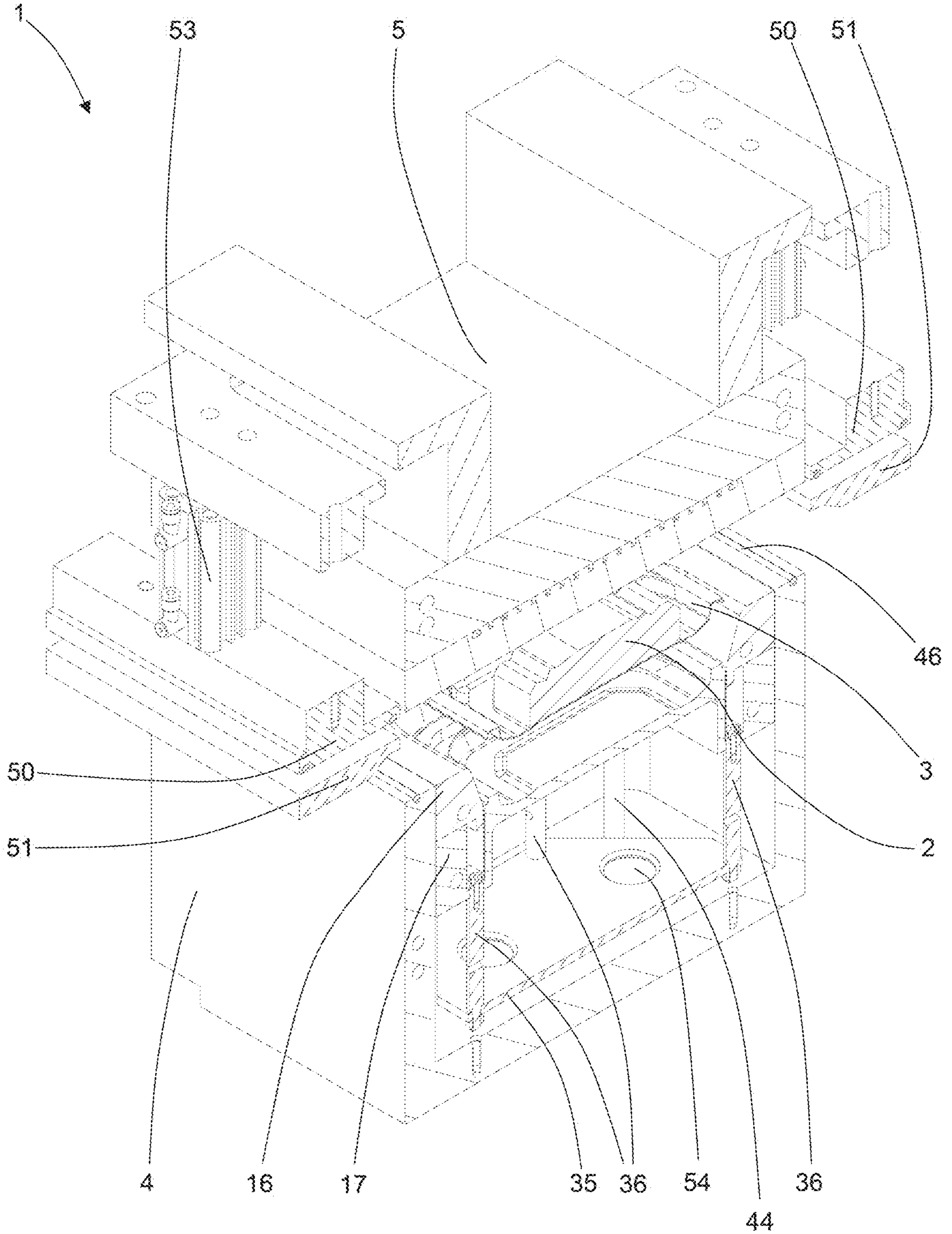
FIG. 15 shows a vertically-sectioned axonometric view of a second vertical section of the apparatus in FIG. 1.
Figure 16:
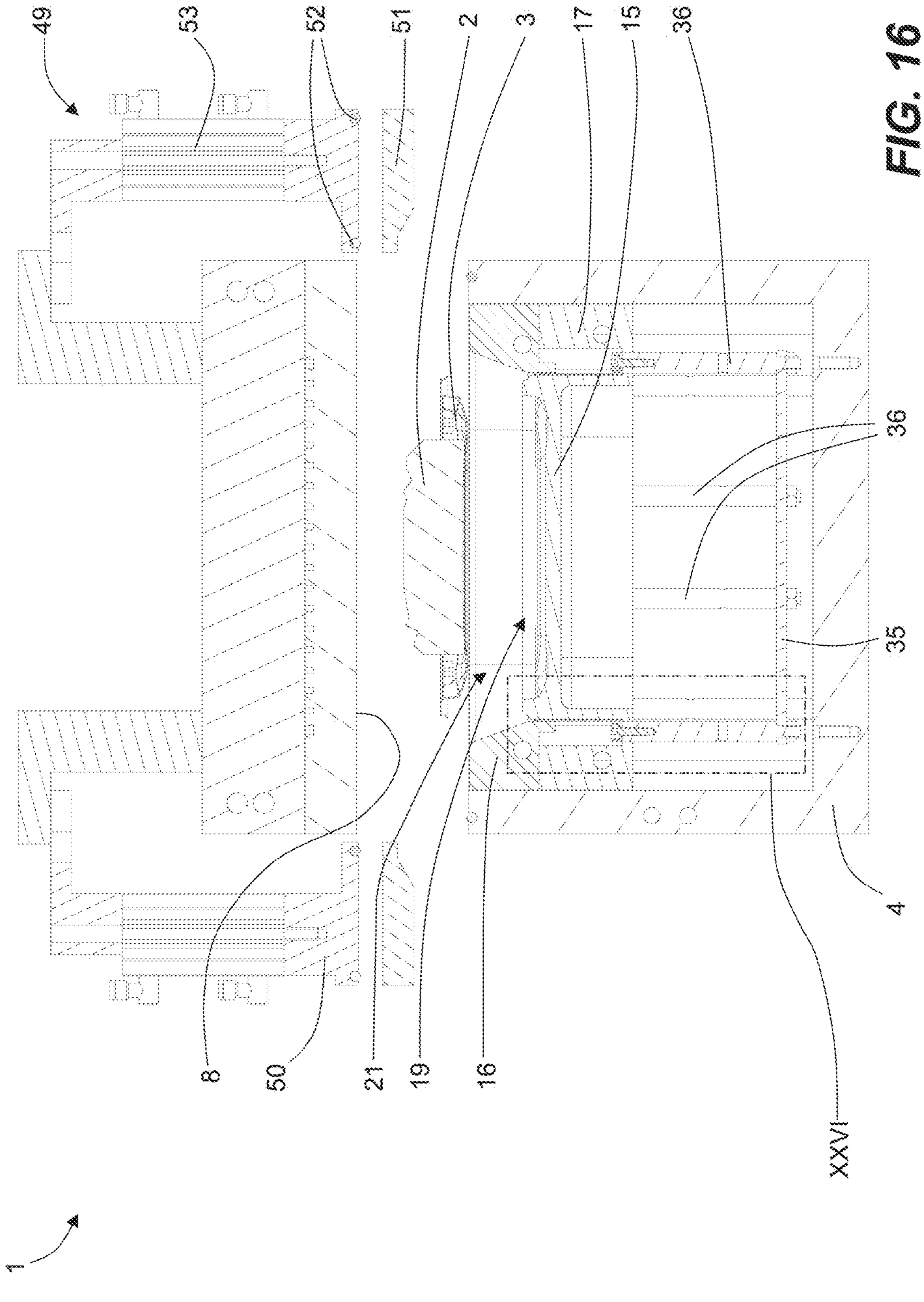
FIG. 16 shows a front view of the second vertical section in FIG. 15.

Secondly, the supporting element 4 comprises cutting means 23 which surround the housing 19 and which are in turn surrounded by the distancing portion 16 (also in this case the various elements are surrounded in planes perpendicular to the line of movement 14 shown in the accompanying drawings). Preferably, said cutting means 23 are mounted in the slits 24, previously introduced, which are made between the housing portion 15 and the distancing portion 16. The cutting means 23 are configured to cut the thermoformable film 9, separating the pack 10 from the excess thermoformable film 9 which, at the end of each working cycle, is applied on the distancing portion 16. Indeed, the cutting means 23 are movable between a lowered position, in which they are advantageously outside the working chamber 6 (FIG. 11), and a raised position, in which they preferably project into the working chamber 6 (FIG. 12), with the movement from the lowered position to the raised position causing cutting of the thermoformable film 9. The cutting means 23 are moved from the bottom upwards, from the lowered position to the raised position, whilst the closing element 5 and the supporting element 4 are kept in the working position (FIG. 7, in which the supporting element 4 and the closing element 5 are in the working position and the cutting means 23 are in the lowered position, and FIG. 8, in which the supporting element 4 and the closing element 5 are in the working position and the cutting means 23 are in the raised position).

Figure 23:
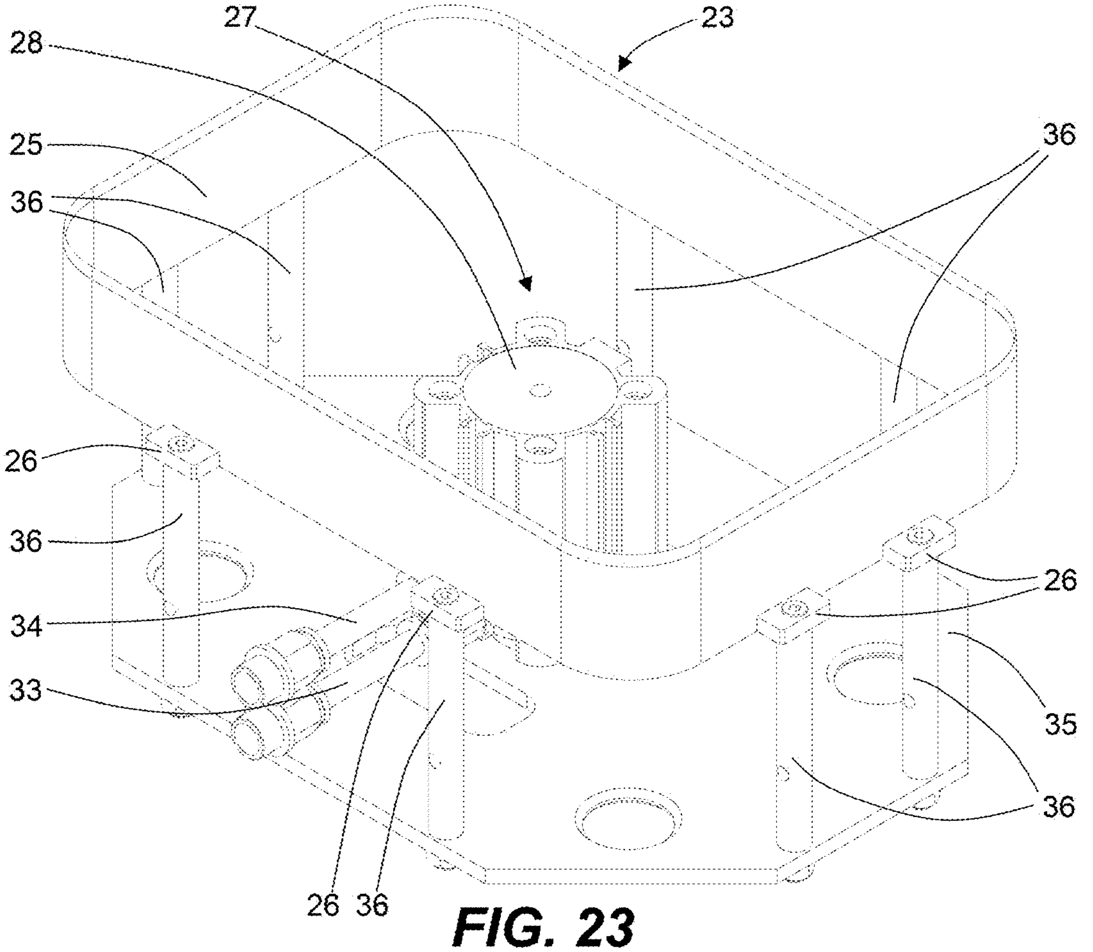
FIG. 23 shows an axonometric view of cutting means and a movement system forming part of the apparatus in FIG. 1.
Figure 24:
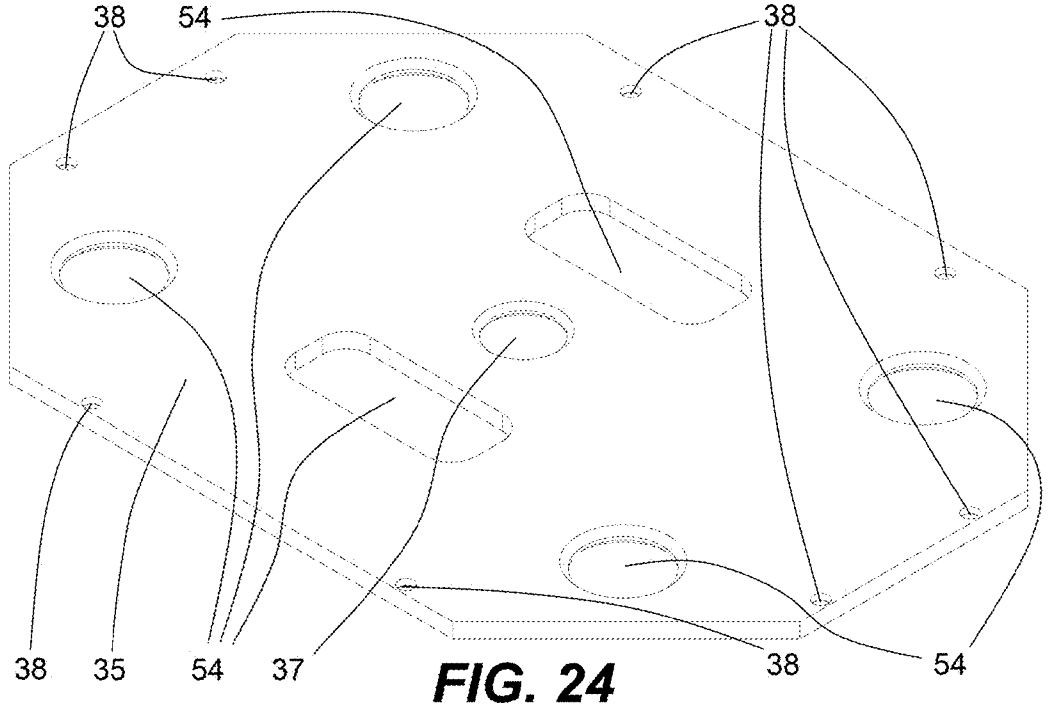
FIG. 24 shows an axonometric view of a connecting plate forming part of the movement system in FIG. 23.
Figure 25:
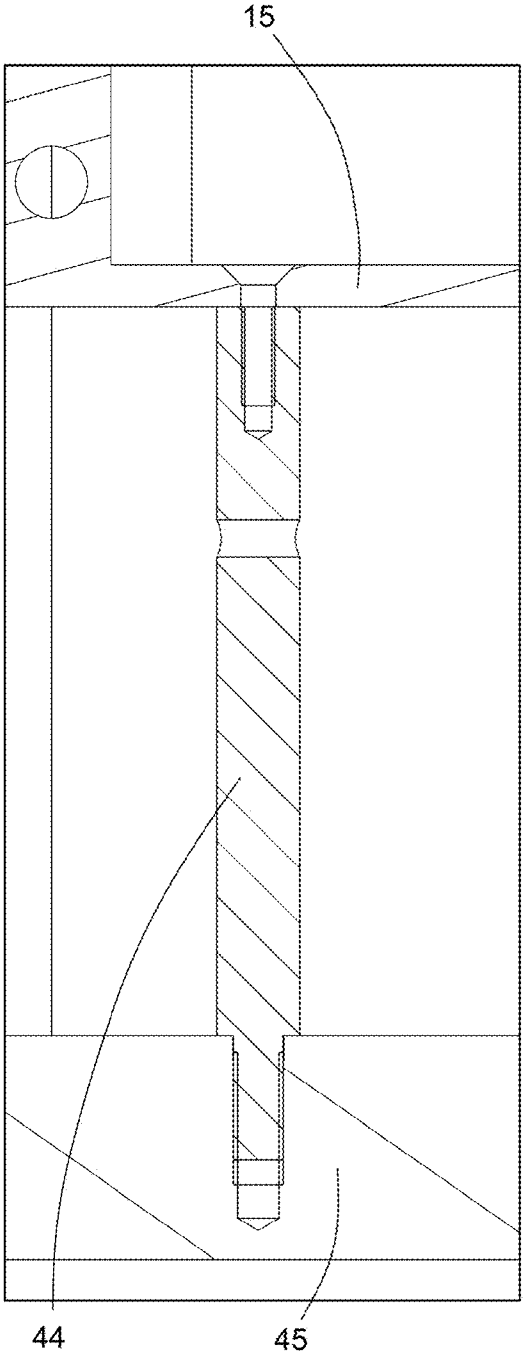
FIG. 25 shows, enlarged, detail XXV of FIG. 14.

The cutting means 23 advantageously comprise one or more blades 25, which are configured to come into contact with the thermoformable film 9 and to cause the cutting of the thermoformable film 9, and one or more connecting portions 26, which are configured to allow the connection of the cutting means 23 to a movement system 27, part of the supporting element 4, which is associated with the cutting means 23 for moving them between the raised position and the lowered position. Advantageously, the cutting means 23 comprise a plurality of connecting portions 26. In particular, in the first embodiment shown, the cutting means 23 comprise only one annular blade 25 and eight connecting portions 26 distributed along the annular length of the blade 25. Other embodiments, on the other hand, can envisage more blades 25, each of which connected to one or more connecting portions 26. In the preferred embodiments, the movement system 27 comprises a first actuator 28 and connecting means 29, with the connecting means 29 being mounted between the first actuator 28 and the cutting means 23. A first preferred embodiment of the movement system 27 and of the cutting means 23 is shown in FIG. 23.

As for the first actuator 28, this is advantageously switchable between a first configuration and a second configuration. When the first actuator 28 is in the first configuration, the cutting means 23 are in the lowered position, whereas when the first actuator 28 is in the second configuration, the cutting means 23 are in the raised position.

Figure 8:
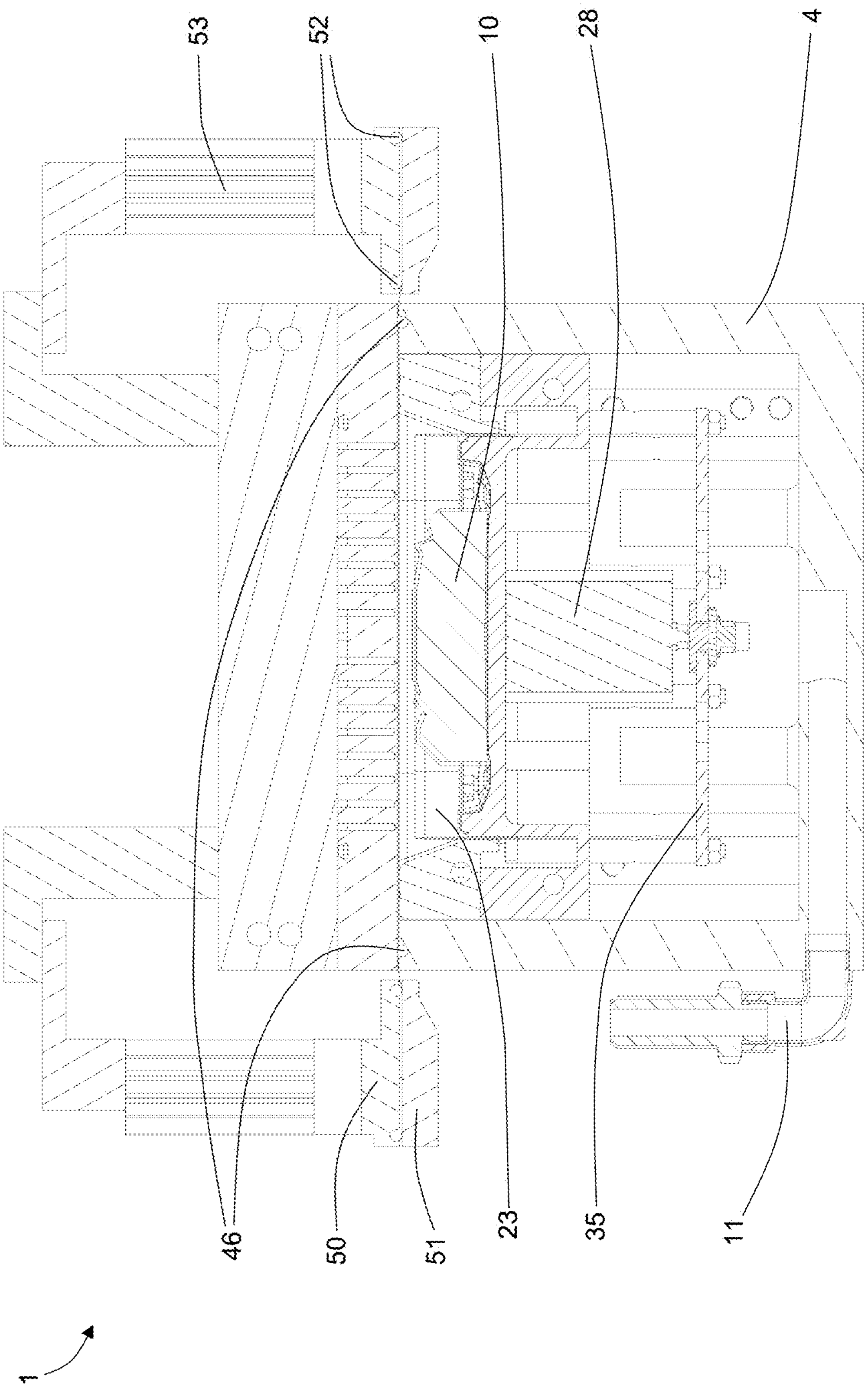
FIG. 8 shows the apparatus in FIG. 7 with the cutting means in a raised position.
Figure 9:
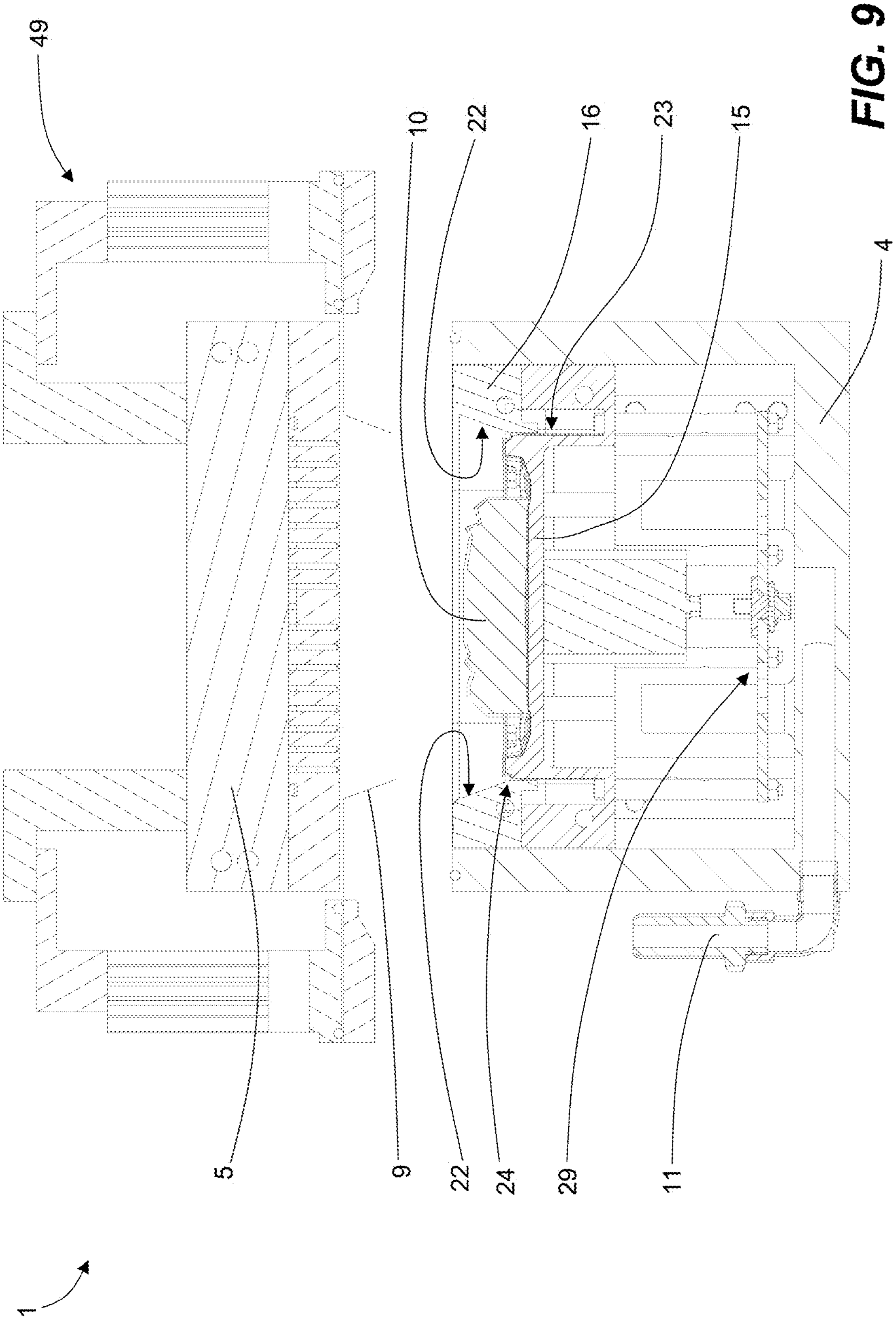
FIG. 9 shows the apparatus in FIG. 8 with the supporting element and the closing element in the home position, with the cutting means in the lowered position and with the retaining device that retains the excess thermoformable film.
Figure 10:
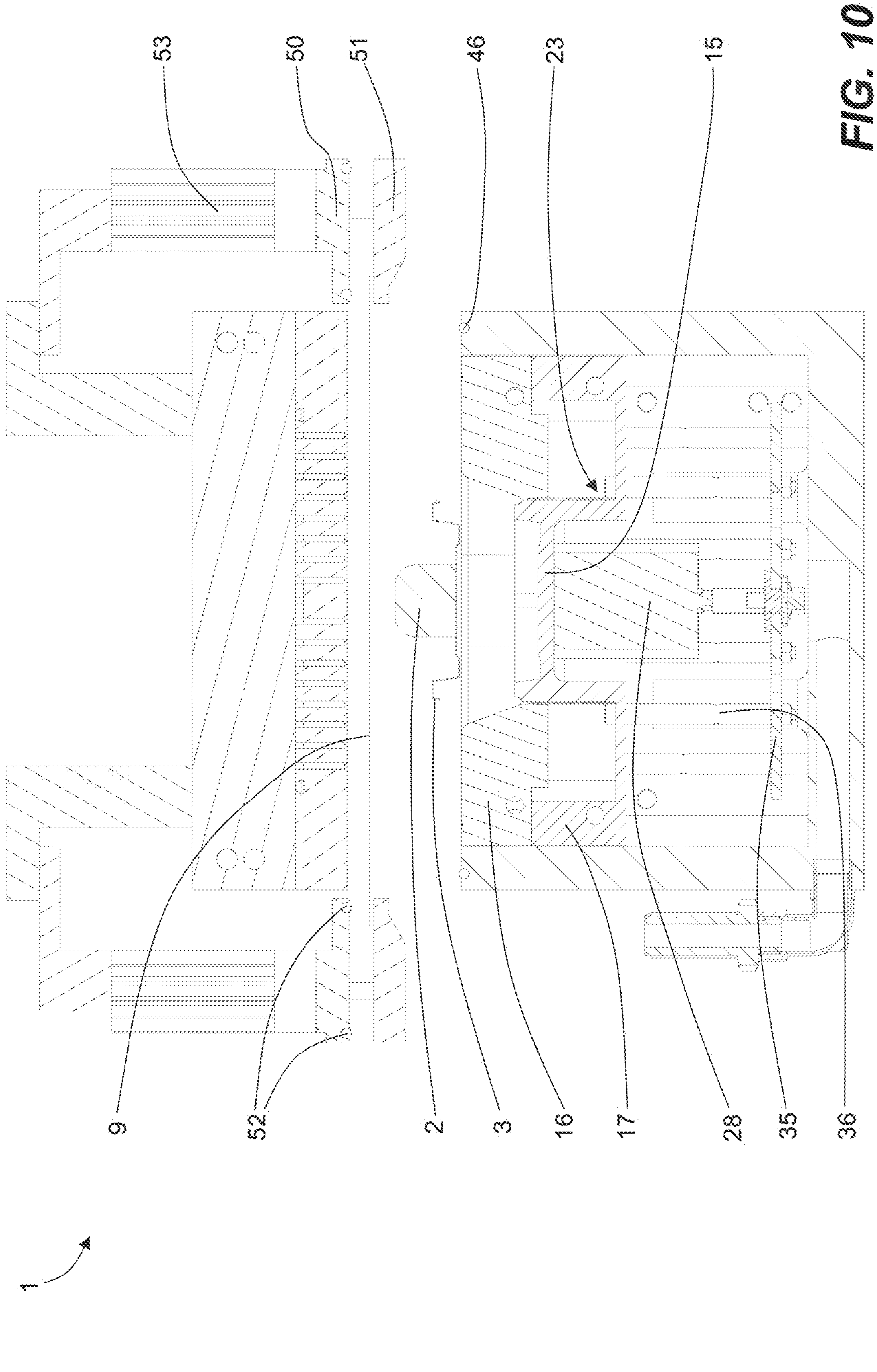
FIG. 10 shows a vertically-sectioned front view of the apparatus in FIG. 3 with an operating member of different type.

In the first embodiment, the first actuator 28 comprises a fixed component 30, which is fixed to the housing portion 15, and a movable component 31, which is movable relative to the fixed component 30 between an extended position and a retracted position. When the first actuator 28 is in the first configuration, the movable component 31 is in the extended position and the cutting means 23 are in the lowered configuration (FIGS. 7 and 9), whereas when the first actuator 28 is in the second configuration, the movable component 31 is in the retracted position and the cutting means 23 are in the raised configuration (FIG. 8). Preferably, the first actuator 28 is a linear actuator. In the first embodiment, the first actuator 28 is a pneumatic actuator, with the fixed component 30 being a cylinder and the movable component 31 being a piston (in the accompanying drawings, the first actuator 28 is shown schematically). The supporting element 4 advantageously comprises drive means 32 for the first actuator 28 which are configured to fluidly connect the first actuator 28 with a suction device and/or with an input device (which is positioned externally relative to the apparatus 1). In the first embodiment, the drive means 32 advantageously comprise a pair of ducts 33, 34 which fluidly connect the first actuator 28 with the suction device and/or with the input device (which are not shown in the accompanying drawings). Advantageously, a first duct 33 fluidly connects the first actuator 28 with the suction device, while a second duct 34 fluidly connects the first actuator 28 with the input device. In such embodiments, the movement of the movable component 31 from the extended position to the retracted position (that is, the switch from the first configuration to the second configuration of the first actuator 28) is caused by the suction of fluid (in particular, air) by the suction device through the first duct 33, while the movement of the movable component 31 from the retracted position to the extended position (that is, the switch from the second configuration to the first configuration of the first actuator 28) is caused by the input of the fluid (in particular, air) by the input device through the second duct 34. In other embodiments, on the other hand, both ducts 33, 34 can be used for the suction of fluid and for the input of fluid. Preferably, the first duct 33 and the second duct 34 are connected fluid-tight to both the first actuator 28 and the rest of the supporting element 4. However, embodiments are possible in which the drive means 32 comprise components different to those described above.

In other embodiments, as in the second embodiment, the fixed component 30 is fixed to an element other than the housing portion 16. In particular, the fixed component 30 is fixed to a supporting member 41, as described in greater detail below.

In any case, the operation of an actuator of this type is known to a person skilled in the art and, for this reason, will not be described in detail. However, it bears highlighting that the type of actuator described is one of the possible types of actuators that can be applied. Indeed, it is possible that the first actuator 28 is an actuator of a type other than a pneumatic actuator such as, for example, an electromechanical actuator.

As regards the connecting means 29, these mechanically connect the first actuator 28 and the cutting means 23. In greater detail, the connecting means 29 mechanically connect the movable component 31 of the first actuator 28 and the cutting means 23.

The following will detail the connecting means 29 with reference to the first embodiment shown in the accompanying drawings. Nevertheless, this should not be construed as limiting the present invention in that it is possible for the connecting means 29 to be of a type and/or form other than those described below.

Advantageously, the connecting means 29 comprise a connecting plate 35, which preferably develops horizontally and which is fixed to the movable component 31 of the first actuator 28, and a plurality of first fastening columns 36, which preferably develop vertically and which are fixed both to the connecting plate 35 and the cutting means 23. In greater detail, the first fastening columns 36 are fixed to the connecting portions 26 of the cutting means 23.

To allow the mutual fixing of the components, the connection plate 35 preferably has a first fastening hole 37 and a plurality of second fastening holes 38, with the first fastening hole 37 and the second fastening holes 38 advantageously being through-holes and extending between the two main faces of the connecting plate 35.

In the first embodiment, the first fastening hole 37 is coupled to an end portion 39 of the movable component 31 of the first actuator 28.

The second fastening holes 38, on the on the other hand, are coupled to the first fastening columns 36.

Figure 26:
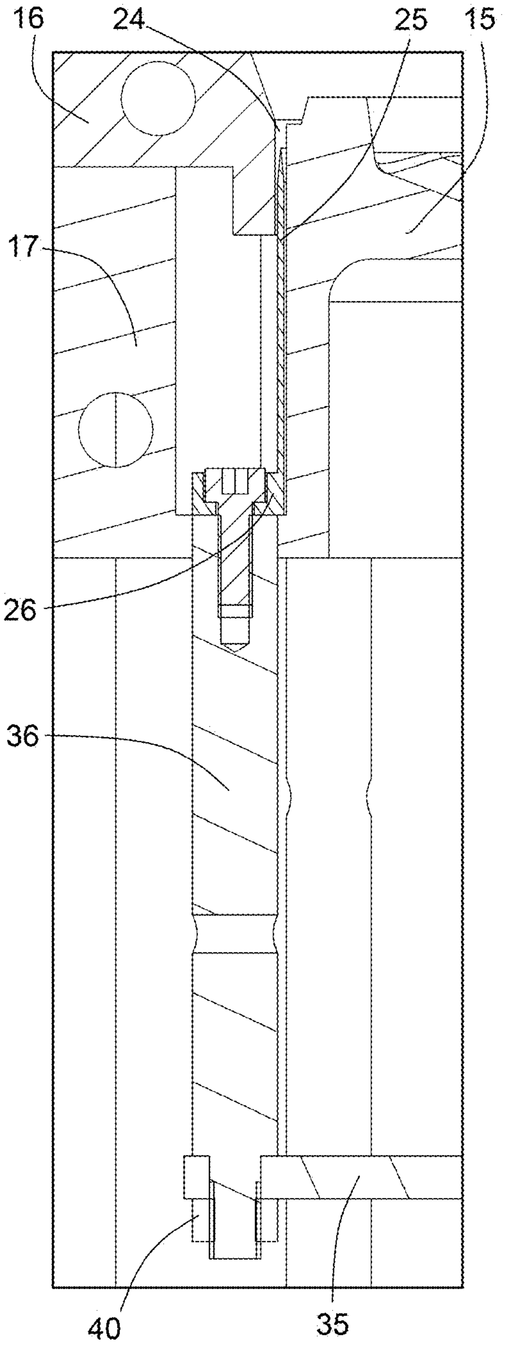
FIG. 26 shows, enlarged, detail XXVI of FIG. 16.

As can be seen in FIG. 26, at the end connected to the respective second fastening hole 38, each first fastening column 36 comprises a portion with a threaded lower cross section inserted inside the second fastening hole 38, and a portion with higher cross section abutting the connecting plate 35. Advantageously, the first fastening column 36 is impeded from slipping out of the second fastening hole 38 by a clamping element 40 (which, in the case at hand, is a screw nut) screwed to the portion with the threaded lower cross-section.

In the first embodiment, the second fastening holes 38 are made at the sides of the connecting plate 35 and are preferably equal in number to the first fastening columns 36 (in particular, eight).

Advantageously, each first fastening column 36 is fixed to the connecting portion 26 by a screw passing through the connecting portion 26 and screwed to the first fastening column 36 (FIG. 26).

Furthermore, to facilitate the creation of the vacuum inside the whole receiving seat 12 by the means for creating the vacuum described above, the connecting plate 35 preferably has a plurality of connecting holes 54, which are pass-through holes and which extend between the two main faces of the connecting plate 35.

Figure 28:
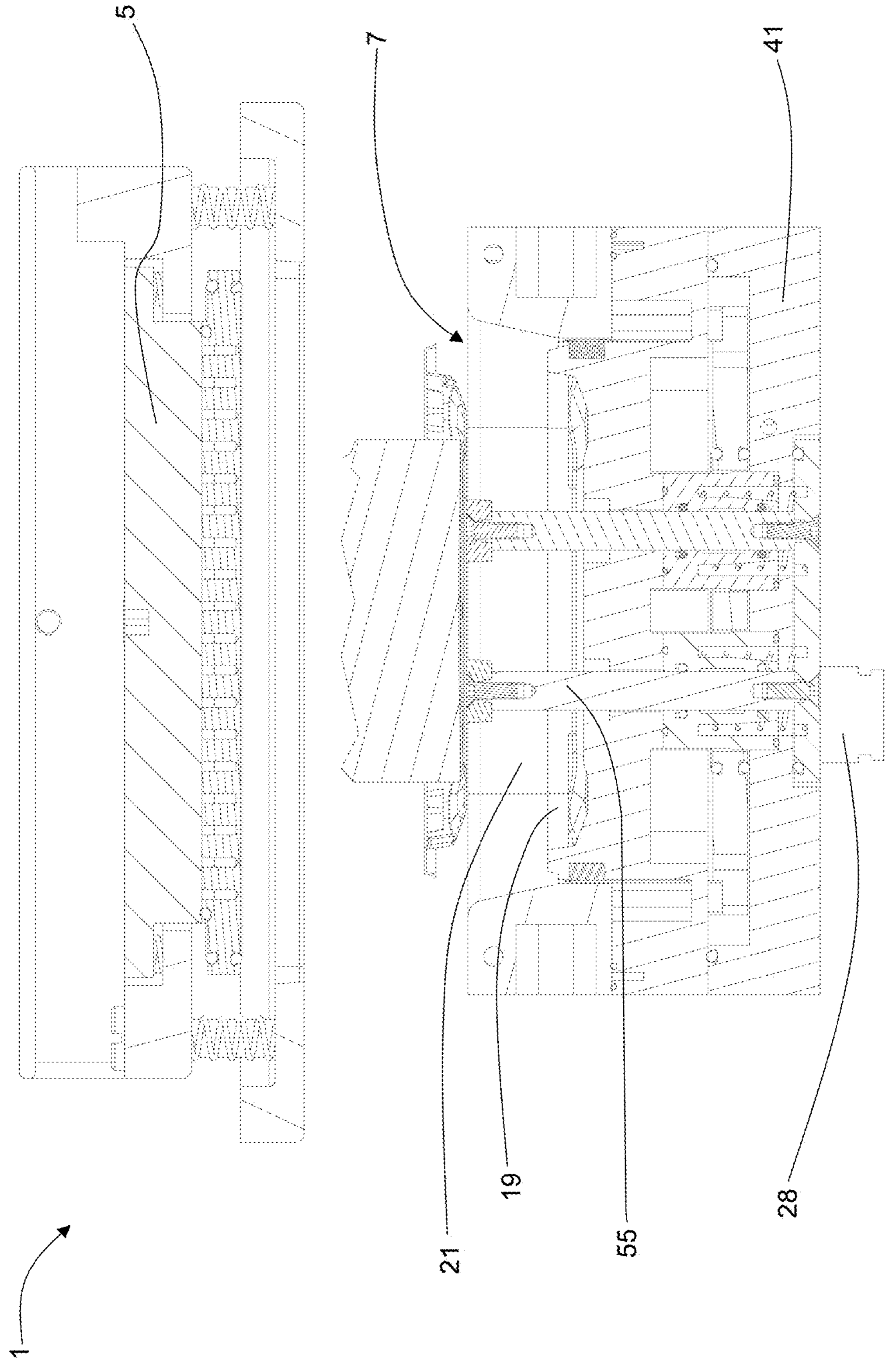
FIG. 28 shows a second vertically-sectioned front view of the apparatus in FIG. 27.

In some embodiments, as shown in the second embodiment, the supporting element 4 can comprise expulsion means 55 which are configured to expel the manufactured pack 10 from the working chamber 6. Such expulsion means 55 are advantageously switchable between an extracted configuration (as seen in FIG. 28) and a retracted configuration. When the expulsion means 55 are in the extracted configuration, these prevent the insertion of the support 3 into the housing 19, and when the expulsion means 55 are in the retracted configuration, they allow the insertion of the support 3 into the housing 19. Advantageously, the movement of the expulsion means 55 from the retracted position to the extracted position causes the expulsion of the support 3 from housing 19. It bears highlighting that the aspects closely related to the expulsion means 55 are known to a person skilled in the art and that, for this reason, they will not be further described in detail.

According to another innovative aspect of the present invention, the supporting element 4 comprises a supporting member 41 and an operating member 42, with the operating member 42 being removably mounted to the supporting member 41. The operating member 42 advantageously comprises the housing portion 15, the distancing portion 16 and the cutting means 23 as well as defining the upper opening 7 of the working chamber 6. In addition, in the first embodiment shown the operating member 42 comprises the movement system 27 of the cutting means 23 (in the second embodiment, on the other hand, the operating member 42 does not comprise the first actuator 28, which, as mentioned, is fixed to the supporting member 41).

Figure 19:
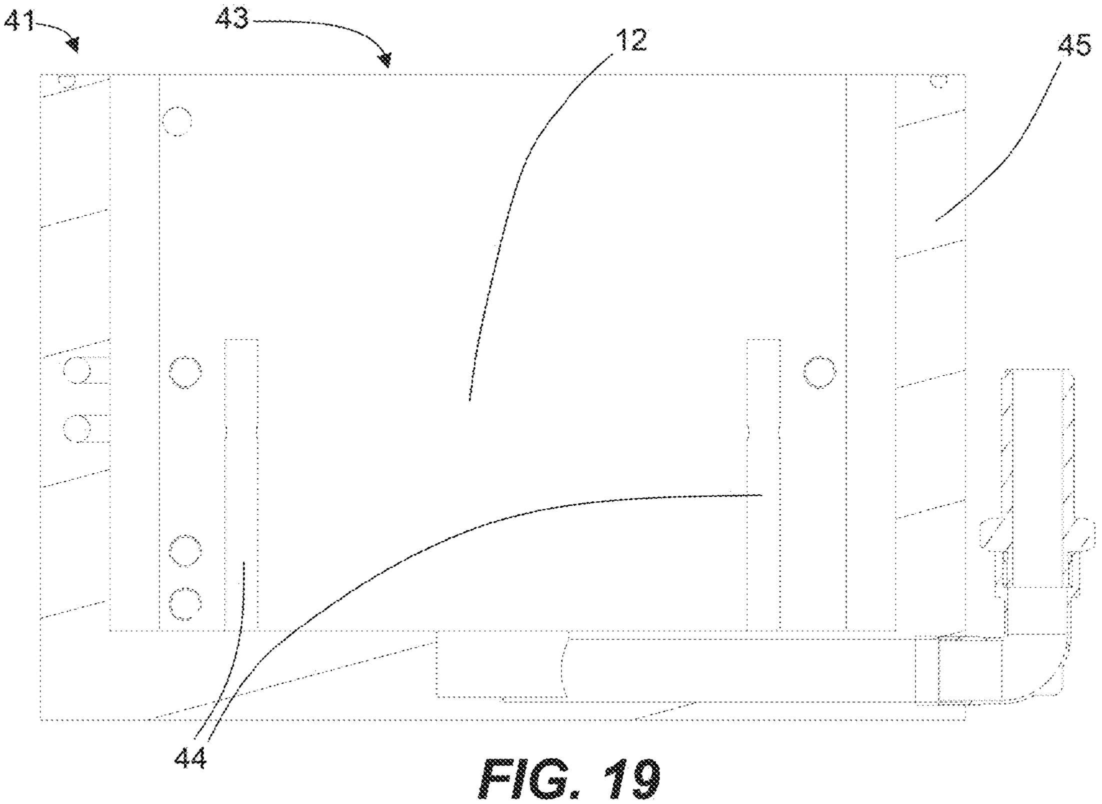
FIG. 19 shows a vertically-sectioned front view of a supporting member forming part of the apparatus in FIG. 1.
Figure 20:
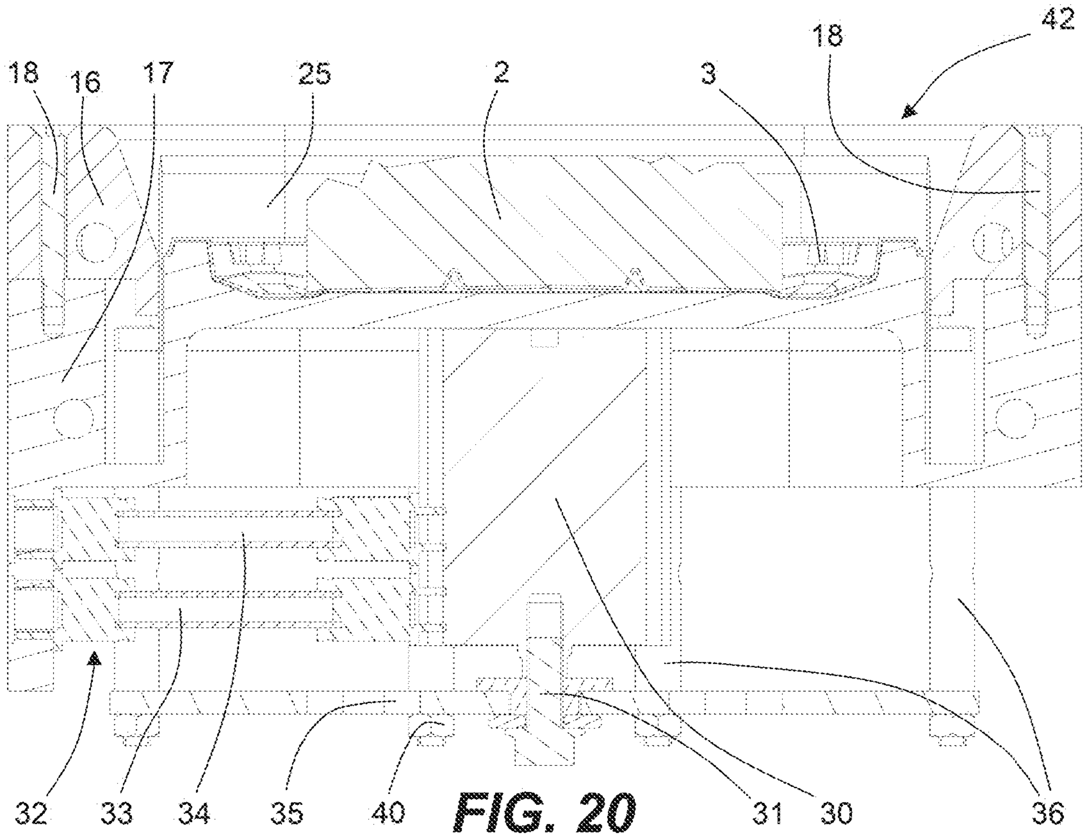
FIG. 20 shows a vertically-sectioned front view of an operating member forming part of the apparatus in FIG. 1 in the configuration in FIG. 8.
Figure 21:
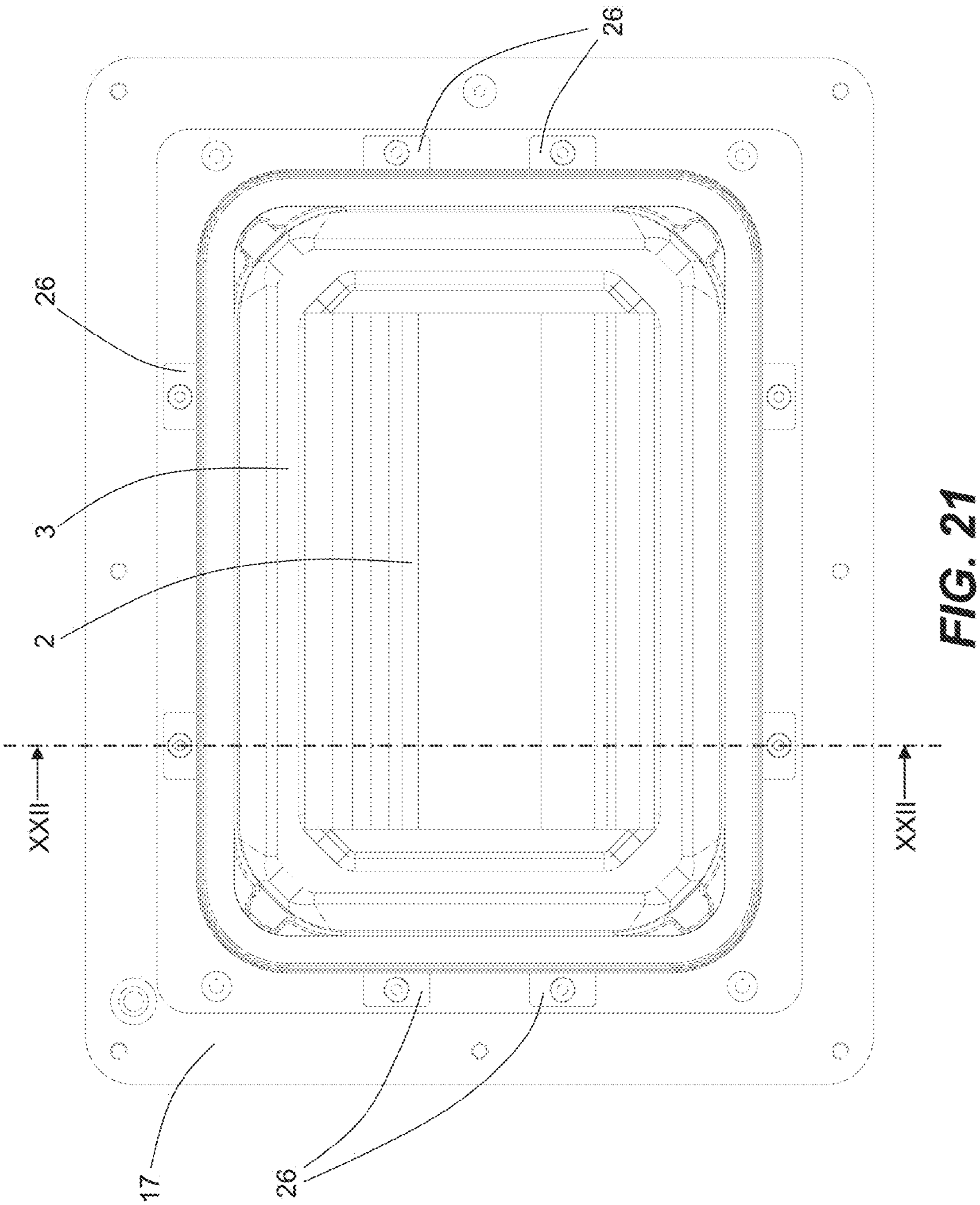
FIG. 21 shows a plan view of a part of the operating member in FIG. 20.
Figure 22:
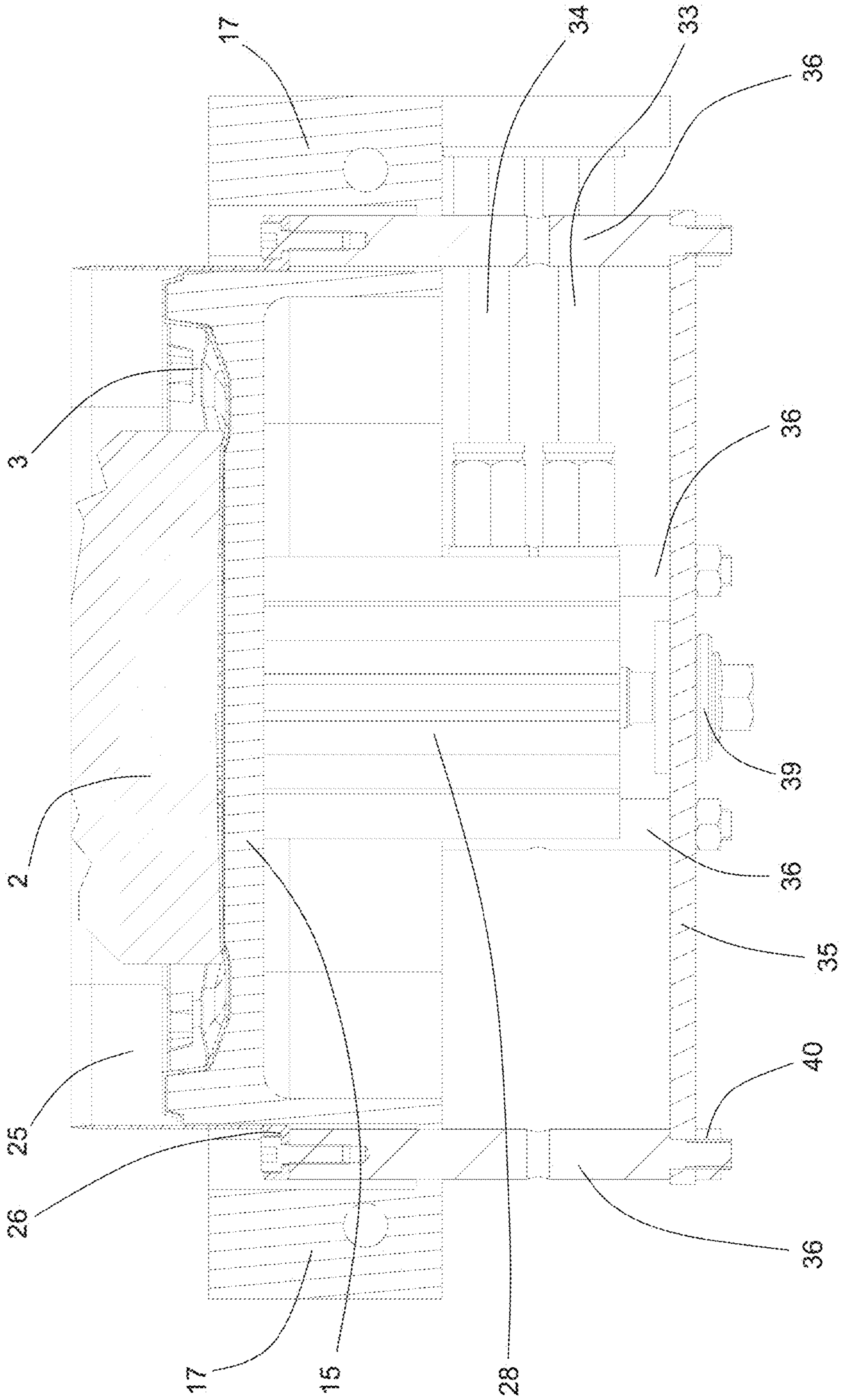
FIG. 22 shows a vertically-sectioned front view of the part of the operating member in FIG. 21, sectioned along the line XXII-XXII.

In the first embodiment, the supporting member 41 defines the receiving seat 12 introduced previously, and the operating member 42 is removably mounted on the supporting member 41 inside the receiving seat 12. In this embodiment, as can be seen in FIG. 19, the receiving seat 12 has an upper insertion mouth 43, through which the operating member 42 can be inserted in the receiving seat 12 and mounted on the supporting member 41, and through which the operating member 42 can be removed from the receiving seat 12 and dismounted from supporting member 41.

In addition, the upper insertion mouth 43 also advantageously defines a largest possible dimension from the upper opening 7 of the working chamber 6 defined by the operating member 42.

To enable the operating member 42 to be mounted on the supporting member 41, the supporting member 41 shown in the first embodiment comprises a plurality of second fastening columns 44, which are fixed at the bottom to a main body 45 of the same supporting member 41 inside the receiving seat 12 and which extends parallel to the line of movement 14 shown in the accompanying drawings. The operating member 42 (in the accompanying drawings the housing portion 15 of the operating member 42, using screws) is fixed at the top end of each second fastening column 44. In particular, in the embodiment shown the supporting member 41 comprises four second fastening columns 44.

In the first embodiment, the supporting member 41 comprises a first sealing gasket 46, which encircles the upper insertion mouth 43. When the supporting element 4 and the closing element 5 are in the working position the first sealing gasket 46 it is clamped against the lower heating face 8, in such a way as to create a gas-tight seal between the closing element 5 and the supporting element 4. The first sealing gasket 46 is not shown in FIGS. 1 and 2, in which can be seen a recess 47 for its installation.

In other embodiments, on the other hand, the sealing gasket 46 is advantageously positioned at the closing element 5 and, when the supporting element 4 and the closing element 5 are in the working position, the first sealing gasket 46 is clamped against the supporting member 41 or against the distancing portion 16.

Figure 27:
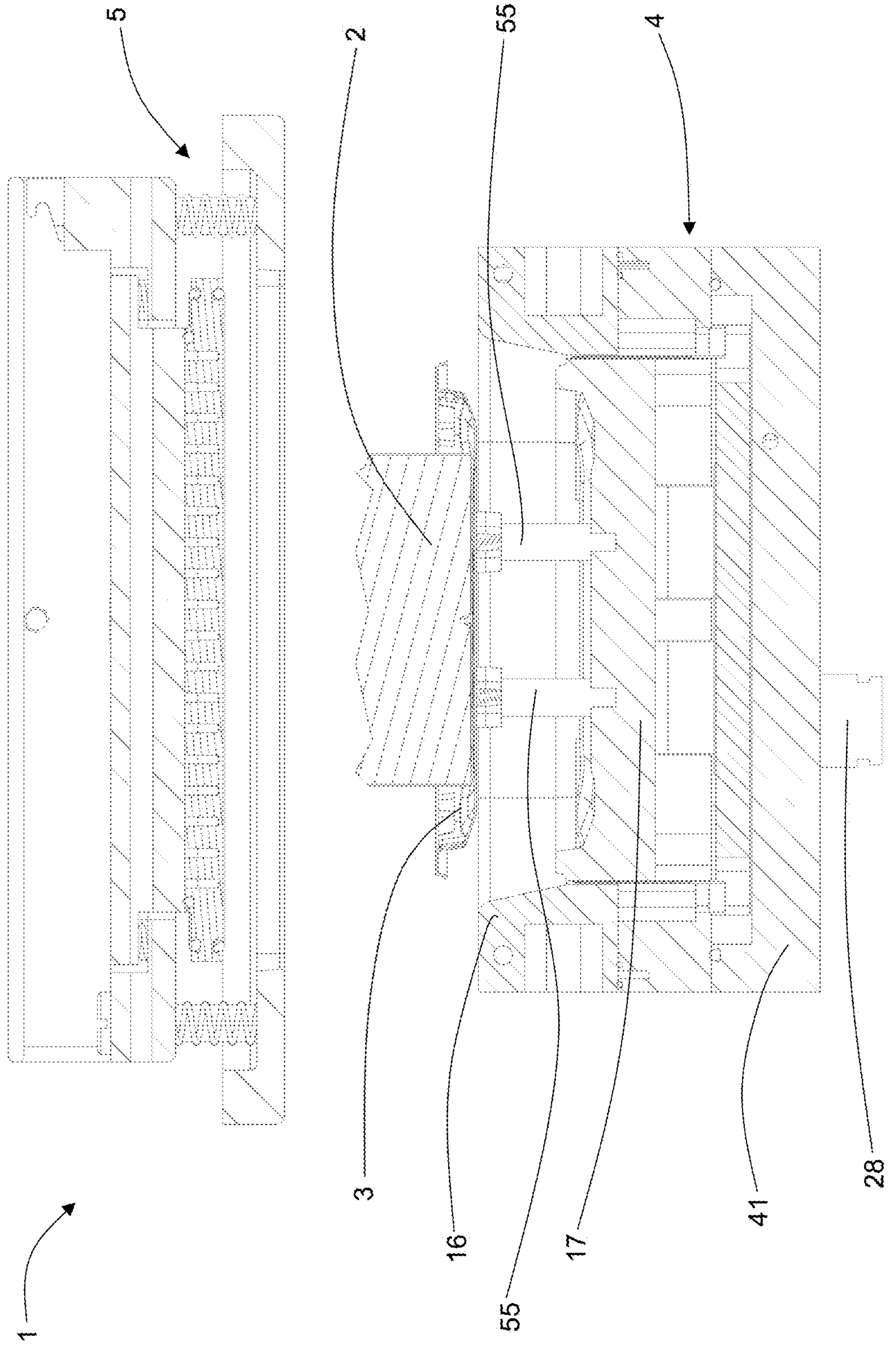
FIG. 27 shows a first vertically-sectioned front view of a second embodiment of the apparatus in FIG. 3 with expulsion means in an extracted position.
Figure 29:
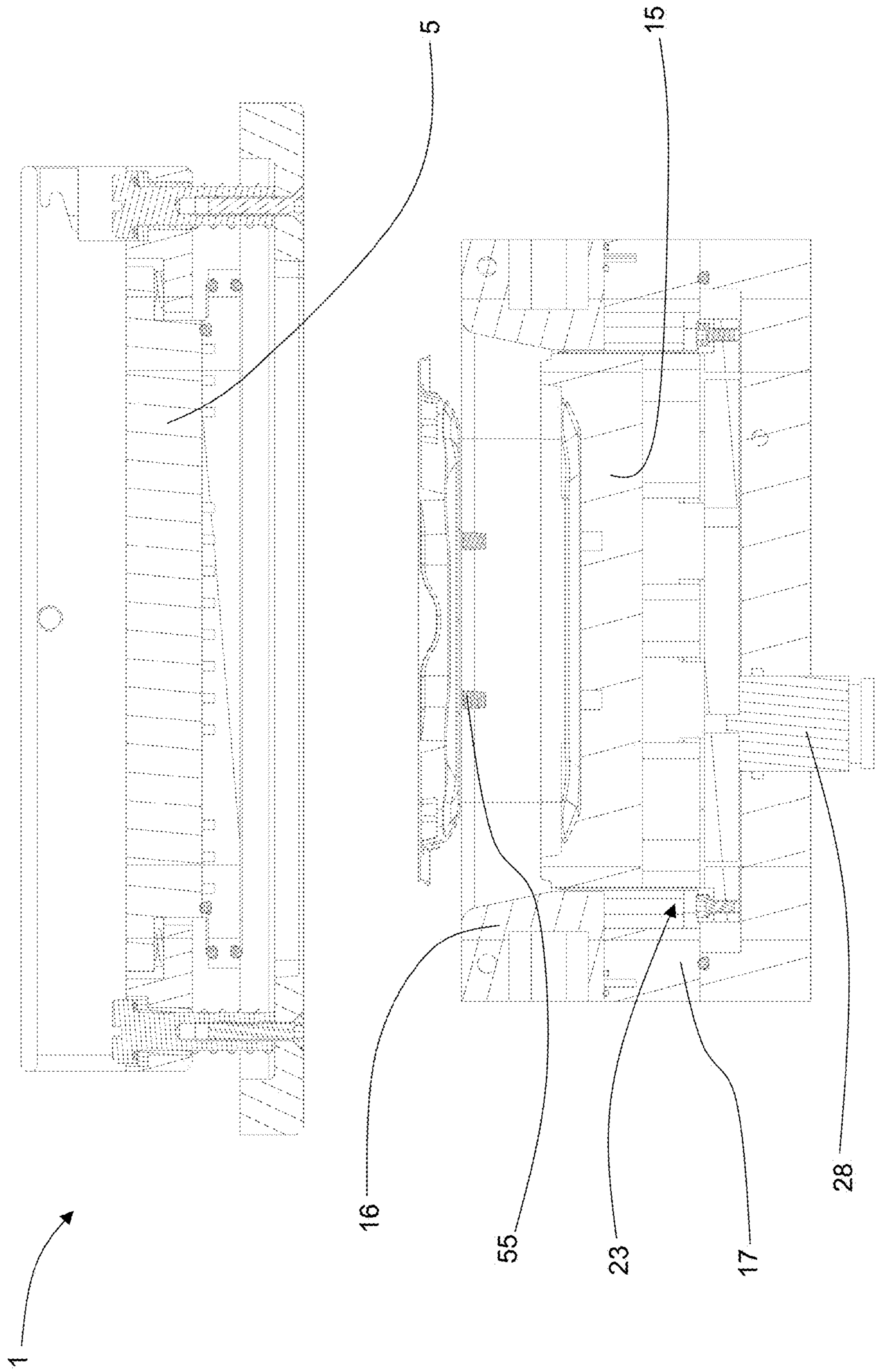
FIG. 29 shows a third vertically-sectioned front view of the apparatus in FIG. 28.

Unlike the first embodiment and as can be seen in FIGS. 27 to 29, in the second embodiment the supporting member 41 defines, on the other hand, a supporting base for the operating member 42, and the same operating member 42 is removably mounted on the supporting base of the supporting member 41. In greater detail, in this embodiment, the housing portion 15 is fixable to the supporting base.

Advantageously, the apparatus 1 comprises a plurality of operating members 42 which are alternately mountable on the supporting member 41 and which are mutually interchangeable. Each operating member 42 defines a respective upper opening 7 and differs from the other operating members 42. In particular, each operating member 42 differs from the other operating members 42 in at least one geometric characteristic related to the shape and/or size of the housing 19 and/or of the distancing space 21 respectively. For example, the housing 19 of an operating member 42 (FIG. 1) can differ from the housing 19 of another operating member 42 (FIG. 8) in that one is configured to receive a support 3 of a first type, and the other is configured to receive a support 3 of a second type. In additional, an operating member 42 can differ from another operating member 42 in that the housing 19 of the first is closer to the upper opening 7 than the housing 19 of the second. It is, however, possible that the operating members 42 differ from each other in more than one characteristic (such as either a characteristic related to the shape of the housing 19 or a characteristic related to the distance between the housing 19 and the upper opening 7) or a characteristic different from those described above.

The possibility of mutually interchanging different operating members 42 by alternately mounting them on the supporting member 41 allows a so-called "format change" to be made very quickly. Indeed, it is sufficient to replace only the operating member 42 coupled with the supporting member 41 with another operating member 42. Indeed, when a format change is to be made, such as switching from packing sliced products (which have a very small thickness and generally project very little relative to the support 3) to packing whole chickens (which project a lot relative to the support 3), the operating member 42 for packing a first product 2 (in this case sliced products) is replaced with the operating member 42 for packing a second product 2 (in this case whole chickens) that advantageously defines a housing 19 either having a different shape or being at a greater distance from the lower heating face 8 relative to the first.

In the preferred embodiments, the lower heating face 8 has an extension such that whatever operating member 42 is mounted on the supporting member 41, when the supporting element 4 and the closing element 5 are in the working position, the upper opening 7 of that operating member 42 is closed entirely by the lower heating face 8. Preferably, the extension of the lower heating face 8 is greater than the maximum extension between the upper openings 7 of the possible operating members 42. Even more preferably, given that in the first embodiment all operating members 42 are sized to be inserted in the receiving seat 12, the extension of the lower heating face 8 is equal to the extension of the upper insertion mouth 43 and of the top edge of the supporting member 41, which delimits it. In other words, projecting the upper opening 7 of each operating member 42 onto the lower heating face 8, advantageously in the case where the lower heating face 8 is completely flat, when the supporting element 4 and the closing element 5 are in the working position, the projection of each upper opening 7 occupies an area that is contained within the lower heating face 8.

As regards the closing element 5, this, as mentioned, has the lower heating face 8, which in some embodiments is completely flat, which is configured to heat the thermoformable film 9 and which advantageously has an extension such to close each upper opening 7 of the mutually interchangeable operating members 42 on the supporting member 41. For this purpose, the closing element 5 preferably comprises heating means 48, which are associated to the lower heating face 8. For example, the heating means 48 can be joule heaters (without, however, limiting the present invention to a specific type of heating means 48).

In some embodiments, preferably in which the lower heating face 8 is completely flat, the heating means 48 are arranged and can be activated such as to be able to heat certain portions of the lower heating face 8, thus being able to heat only some areas of the thermoformable film 9 without necessarily having to heat all of it. This is advantageous where it is envisaged to make the format change described above: for each operating member 42 it is possible to activate the heating means 48 such to heat only the portion of the lower heating face 8 that closes the respective upper opening 7. For example, in the case where the apparatus 1 comprises a first operating member 42 and a second operating member 42 which have upper openings 7 with different extensions (for example, the upper opening 7 of the first operating member 42 has an extension greater than the upper opening 7 of the second operating member 42), based on the operating member 42 mounted on the supporting member 41, it is possible to activate heating means 48 more suited to the purpose.

In addition, the closing element 5 advantageously comprises a suction system that is configured to hold the thermoformable film 9 and to keep it in contact with the lower heating face 8. The characteristics of the suction system are known to a person skilled in the art and, for this reason, will not be described in detail below.

Figure 5:
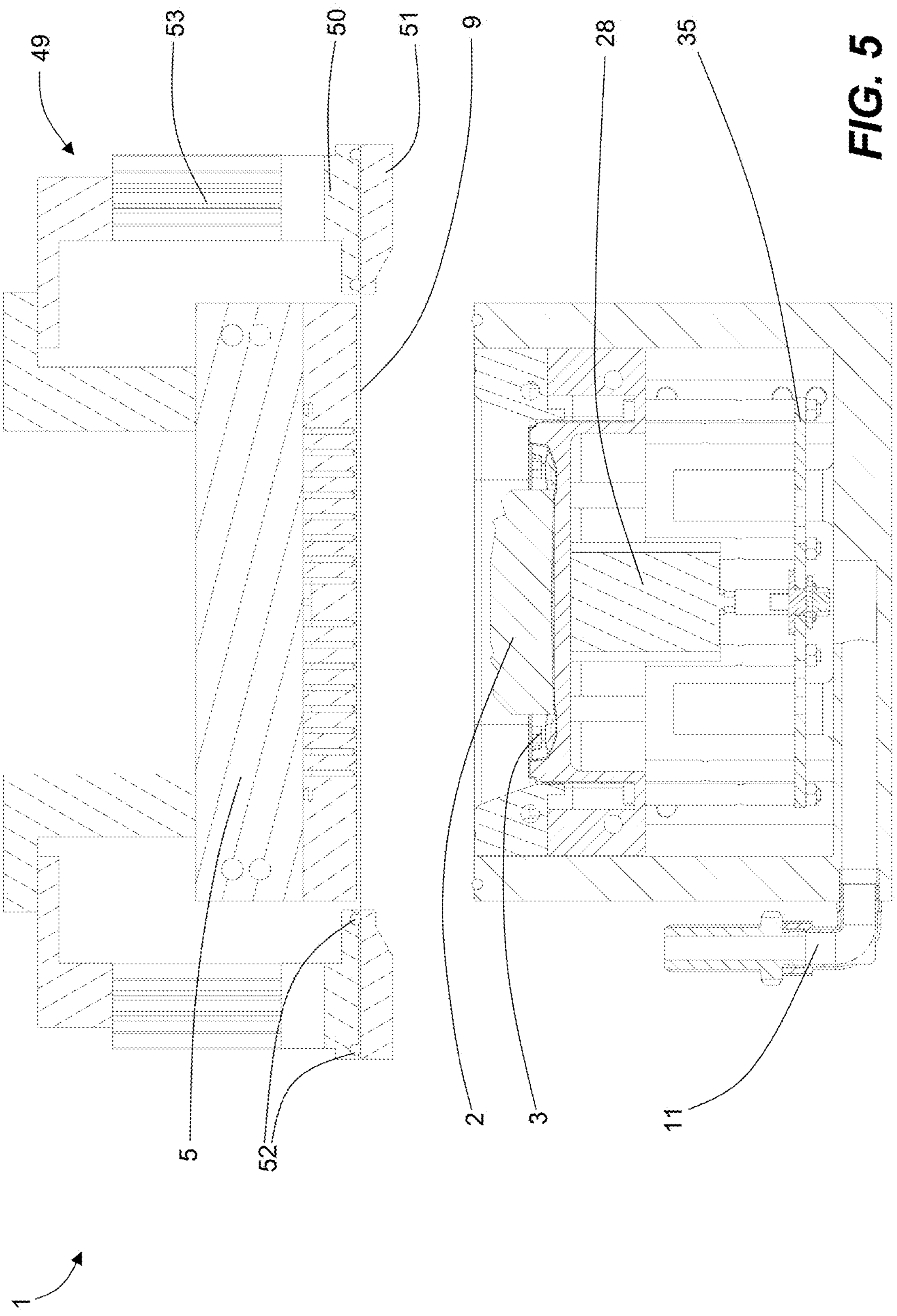
FIG. 5 shows the apparatus in FIG. 4 with the retaining device in a closing configuration.

In some embodiments, as in the first embodiment, the apparatus 1 also comprises a retaining device 49 of the thermoformable film 9 which is switchable between an opening configuration and a closing configuration. In the opening configuration, the retaining device 49 is uncoupled from the thermoformable film 9 (FIG. 4), whereas in the closing configuration the retaining device 49 retains the thermoformable film 9 interposed between the supporting element 4 and the closing element 5 (FIG. 5). When the retaining device 49 is in the opening configuration the thermoformable film 9 is free to slide relative to the retaining device 49, to be positioned in view of a working cycle or to be removed at the end of the working cycle.

The retaining device 49 of the thermoformable film 9 is in the closing configuration at least when the supporting element 4 and the closing element 5 are moved from the working position to the home position. In particular, the retaining device 49 of the thermoformable film 9 is in the closing configuration during the movement of the supporting element 4 and/or of the closing element 5 from the working position to the home position such to retain the thermoformable film 9 during the opening of the working chamber 6, so as to detach the thermoformable film 9 from the distancing portion 16. In some embodiments, as in the first embodiment, however, the retaining device 49 is in the closing configuration also when the supporting element 4 and the closing element 5 are moved from the home position to the working position. Preferably, the retaining device 49 of the thermoformable film 9 switches its configuration from the opening configuration to the closing configuration and from the closing configuration to the opening configuration when the supporting element 4 and the closing element 5 are in the home position. In addition, the retaining device 49 is advantageously integral to the closing element 5. In particular, where the closing element 5 is moveable relative to the supporting frame, the retaining device 49 is moveable integrally with the closing element 5.

It bears highlighting that the retaining device 49 may advantageously be configured to retain, when in the closing configuration, both a continuous thermoformable film 9 (which is fed to the retaining device 49 for instance by the unwinding of a reel), and a thermoformable film 9 in sheets (which is fed to the retaining device 49 for instance by a conveyor).

In some embodiments in which the closing element 5 does not comprise the suction system, the retaining device 49 of the thermoformable film 9 can advantageously be configured to also keep the thermoformable film 9 in contact with the lower heating face 8.

Advantageously, the retaining device 49 in turn comprises a first retaining element 50 and a second retaining element 51 which are movable at least one relative to the other between a spaced position and a near position. The spaced position corresponds to the opening configuration of the retaining device 49, whereas the near position corresponds to the closing configuration of the retaining device 49. In the spaced position, the first retaining element 50 and the second retaining element 51 are spaced apart and uncoupled from each other. In the near position, on the other hand, the first retaining element 50 and the second retaining element 51 are near and coupled to each other to lock the thermoformable film 9 between them.

Advantageously, as can be seen in the accompanying drawings relating to the first embodiment, one of the first retaining element 50 and the second retaining element 51 (for example, the first retaining element 50) is fixed and stationary relative to the closing element 5, whereas the other (for example, the second retaining element 51) is moveable relative to the closing element 5. In addition, at least one of the first retaining element 50 and the second retaining element 51 (for example, the first retaining element 50) comprises second sealing gaskets 52 to create greater friction between the first retaining element 50 and/or the second retaining element 51 and the thermoformable film 9 (in FIGS. 1 and 2, the second sealing gaskets 52 are not shown). Advantageously, the retaining device 49 in turn comprises at least a second actuator 53 which is configured to cause the reciprocal movement between the first retaining element 50 and the second retaining element 51. Preferably, the second actuator 53 is a linear actuator. In addition, the second actuator 53 is advantageously a pneumatic actuator.

Preferably, in the first embodiment, the retaining device 49 comprises at least two pairs each comprising a first retaining element 50 and a second retaining element 51, and which are positioned on opposite sides of the closing element 5.

Figure 2:
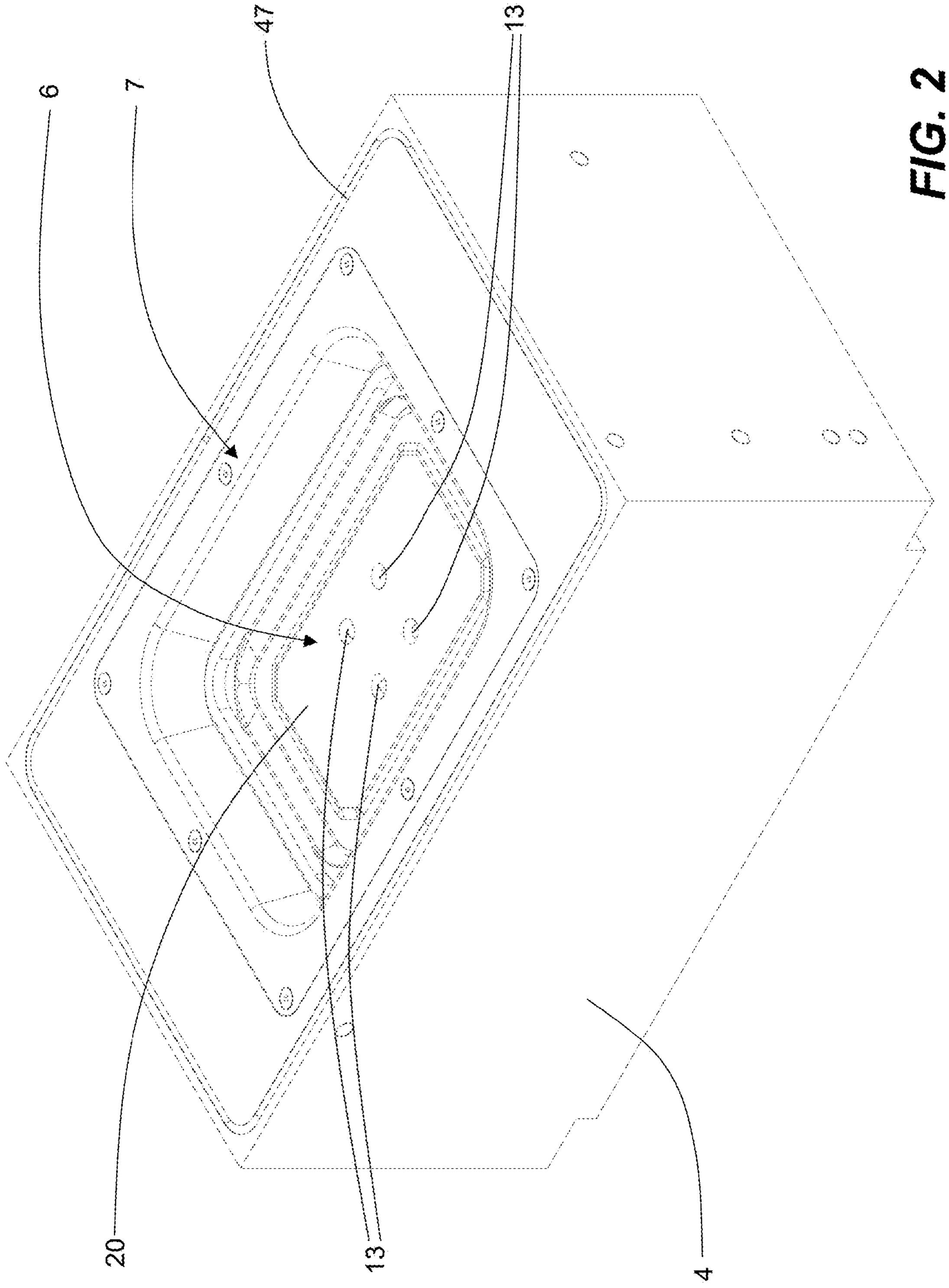
FIG. 2 shows an axonometric view of an element supporting the apparatus in FIG. 1.

In the embodiment shown in FIG. 1, each pair comprises a pair of second actuators 53.

It bears highlighting that the characteristics related to the movement of the first retaining element 50 and the second retaining element 51 should not be considered limiting for the present invention, in that embodiments not shown and/or described are possible. For example, it is possible for the second actuator 53 to be an actuator of a different type, or for the retaining device 49 to comprise a different number of second actuators 53.

In other embodiments, on the other hand, the retaining device 49 of the thermoformable film 9 is not present, such as in the second embodiment. Indeed, in this case, the inner walls 22 are treated in such a way as to prevent adhesion of the thermoformable film 9 on them. In particular, it is possible for the inner walls 22 to be processed superficially, such as where the inner walls 22 are coated with a ceramic material.

We now proceed to describe the method for skin application of a thermoformable film 9 to a support 3, as described in the present invention. Such method can advantageously be implemented using the embodiments of the apparatus 1 for skin application of a thermoformable film 9 to a support 3, as described in the present invention so far.

Similarly to as described with reference to the apparatus 1, the present method was also developed with reference to the skin packaging of a product 2 by applying the thermoformable film 9 to both the support 3 and the product 2 placed on the support 3. However, the present invention may also be used to apply the thermoformable film 9 to only the support 3.

First, the method comprises an inserting step, in which the support 3 is inserted into a working chamber 6 which has an inner surface.

There is then a positioning step, in which the thermoformable film 9 is positioned above the working chamber 6 and above the support 3. FIG. 3 schematically shows a product 2 on the support 3 and the thermoformable film 9 above the working chamber 6, with the support 3, being outside the working chamber 6, whereas the inserting step can be seen passing from the situation in FIG. 3 to the situation in FIG. 4.

Next, the method comprises both a closing step (as can be seen passing from the situation in FIG. 5 to the situation in FIG. 6) and a heating step. In the closing step, which is carried out after the positioning step, the top of the working chamber 6 is closed with a heating surface, which is advantageously completely flat, whereas in the heating step the thermoformable film 9 is heated through the heating surface. During the closing step and at the end of it, the thermoformable film 9 is kept interposed between the support 3 and the heating surface.

In the apparatus 1 described in the present invention, the closing step is carried out by the movement of the supporting element 4 and/or of the closing element 5 from the home position to the working position, closing the top of the working chamber 6 with the lower heating face 8. Indeed, during such movement, the working chamber 6 is closed at the top by the lower heating face 8 of the closing element 5. In the apparatus 1 described in the present invention, the heating step, on the other hand, is carried out by heating the thermoformable film 9 through the lower heating face 8. Advantageously, then, the lower heating face 8 of the closing element 5 corresponds to the heating surface.

Although the heating step can be carried out after the closing step, it can also be carried out before or at the same time as the closing step. For example, it is possible for the thermoformable film 9 to be heated during the closing of the working chamber 6, or for the thermoformable film 9 to be heated before beginning the closure of the working chamber 6 (as in the case where the thermoformable film 9 is preheated).

The method them comprises, in order, a skin application step, a cutting step and an opening step.

In the skin application step (performed passing from the situation in FIG. 6 to the situation in FIG. 7), which is performed after the heating step by creating the vacuum between the thermoformable film 9 and the support 3, the heated thermoformable film 9 is made to adhere on the support 3 by fixing a first portion of the thermoformable film 9 to the support 3 to obtain a pack 10. In addition, during the skin application step, the heated thermoformable film 9 is also made to adhere both on part of the inner surface of the working chamber 6 not covered by the support 3, forming a second portion of the thermoformable film 9 on the inner surface.

In the apparatus 1 described in the present invention, in the skin application step, the heated thermoformable film 9 is made to adhere on the support 3 both on part of the inner surface of the working chamber 6 not covered by the support 3, and through the means for creating the vacuum 11 which create the vacuum inside the working chamber 6 when the supporting element 4 and the closing element 5 are in the working position (and the working chamber 6 is closed at the top by the lower heating face 8).

In the cutting step (performed passing from the situation in FIG. 7 to the situation in FIG. 8, and respective details in FIGS. 11 and 12) the thermoformable film 9 is cut to separate the first portion of the thermoformable film 9 from the second portion of the thermoformable film 9 in such a way as to separate the excess thermoformable film 9 (the second portion) from the pack 10.

In the apparatus 1 described in the present invention, the cutting step is performed by the cutting means 23, through the movement of the cutting means 23 from the lowered position to the raised position. Indeed, such movement causes the cutting of the thermoformable film 9.

In the opening step (performed passing from the situation in FIG. 8 to the situation in FIG. 9), the top of the working chamber 6 is cleared from the heating surface. This enables the working chamber 6 to be accessed to take out, or expel, the manufactured pack 10 from the working chamber 6.

In the apparatus 1 described in the present invention, the opening step is carried out by the movement of the supporting element 4 and/or of the closing element 5 from the working position to the home position. Indeed, during such movement, the working chamber 6 is cleared at the top by the lower heating face 8 of the closing element 5.

Preferably, the method also comprises a retaining step in which the thermoformable film 9 is retained by retaining it outside of the working chamber 6. Advantageously, the retaining step is commenced immediately after the positioning step and lasts until the opening step is complete. Indeed, after having positioned the thermoformable film 9 on the working chamber 6, the thermoformable film 9 is advantageously retained. In addition, as can be seen from the accompanying drawings, the closing step, the heating step, the skin application step, the cutting step and the opening step are preferably performed during the performance of the retaining step. This, however, should not be construed as limiting the present invention since it is possible that only some of the steps described above (such as, for example, the skin application step, the cutting step and the opening step) may be performed during the performance of the retaining step.

In the apparatus 1 described in the present invention, the retaining step is performed by means of the retaining device 49 which retains the thermoformable film 9. Advantageously, the first retaining element 50 and the second retaining element 51 are in the near position and the retaining device is in the closing configuration.

In the preferred embodiments, the method also comprises a removing step (performed passing from the situation in FIG. 8 to the situation in FIG. 9) performed after the cutting step and during the retaining step, during which the second portion of the thermoformable film 9 is detached from the inner surface of the working chamber 6. Advantageously, the opening step and the removing step are performed simultaneously: when the top of the working chamber 6 is cleared from the heating surface, the thermoformable film 9 is detached from the inner surface of the working chamber 6.

Some embodiments can provide for the removing step being performed simultaneously with the retaining step.

In the apparatus 1 described in the present invention, the removing step is advantageously carried out keeping the retaining device 49 in the closing configuration while the supporting element 4 and/or the closing element 5 are moved from the working position to the home position.

As described above, the present method was also developed with reference to the skin packaging of a product 2 by applying the thermoformable film 9 to both the support 3 and the product 2 placed on the support 3. In this case, the method also comprises a placing step, which is performed before the closing step, in which the product 2 is placed on the support 3.

In the further steps of the method presented above, the description of the support 3 also applies to the case where the product 2 is present on the support 3.

In particular, in the positioning step the thermoformable film 9 is positioned both above the working chamber 6 and above the support 3 and the product 2 that is places on the support 3. In addition, in the closing step the top of the working chamber 6 is preferably closed with the heating surface keeping both the product 2 spaced apart from the heating surface, and the thermoformable film 9 interposed between the product 2 and the heating surface. With reference to the skin application step, on the other hand, the heated thermoformable film 9 is preferably made to adhere both on the support 3 and on the product 2 and, as described above, on part of the inner surface of the working chamber 6, fixing the first portion of the thermoformable film 9 to the support 3 to seal the product 2 between the support 3 and the thermoformable film 9 and thus obtain the pack 10.

The present invention offers significant advantages.

Indeed, thanks to the present invention, it has been made possible to make an apparatus and implement a method for the skin application of a thermoformable film to a support that make it possible to package a product projecting in a relatively simple way and to obtain a pack of a quality at least equal to or better than the quality of packs obtained using the known apparatuses.

Second, through the use of a plurality of interchangeable operating members associated with the lower heating face, it was possible to make an apparatus and implement a method for the skin application of a thermoformable film to a support that make it possible to operate a format change more quickly and easily than the known apparatuses.

Finally, it is worth noting that the present invention is relatively easy to make and that the cost associated with its implementation is also not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for skin application of a thermoformable film to a support, comprising:

a supporting element, which defines a working chamber which has an upper opening and which is configured to receive, in use, the support; and a closing element, which has a lower heating face configured to heat, in use, the thermoformable film to be applied on the support;

wherein:

the supporting element and the closing element are movable, at least one relative to the other, between a home position, in which the supporting element and the closing element are uncoupled and spaced apart from each other and the working chamber is open, and a working position, in which the supporting element and the closing element are coupled to each other and in which the upper opening is completely closed by the lower heating face;

the apparatus also comprises means for creating the vacuum, which are associated with the supporting element and which are configured to generate the vacuum in the working chamber when the supporting element and the closing element are in the working position and to cause in use adhesion of the thermoformable film to the support;

the supporting element comprises a housing portion, which defines a housing configured to receive, in use, the support, and a distancing portion, which is placed between the housing portion and the upper opening and which defines a distancing space interposed between the housing and the upper opening, the housing and the distancing space being part of the working chamber;

the distancing portion defines the upper opening;

when the supporting element and the closing element are in the working position the distancing portion is placed between the housing portion and the upper opening and the distancing space is interposed between the housing and the upper opening;

the supporting element also comprises cutting means which surround the housing, which are surrounded by the distancing portion and which are movable between a lowered position and a raised position, the movement from the lowered position to the raised position of the cutting means causing, in use, cutting of the thermoformable film, the cutting means being moved in use from the bottom upwards from the lowered position to the raised position whilst the closing element and the supporting element are kept in the working position.

2. The apparatus according to claim 1, wherein the lower heating face is completely flat.

3. The apparatus according to claim 1, wherein the distancing portion extends continuously around the housing portion and has inner walls which are inclined relative to a horizontal reference plane, when the supporting element and the closing element are in the working position the inner walls converging moving away from the lower heating face.

4. The apparatus according to claim 1, wherein the supporting element comprises a supporting member and an operating member, the operating member comprising the housing portion, the cutting means and the distancing portion and defining the upper opening, the operating member being removably mounted on the supporting member.

5. The apparatus according to claim 4, wherein the supporting member defines a receiving seat, and wherein the operating member is removably mounted on the supporting member inside the receiving seat.

6. The apparatus according to claim 4, wherein the supporting member defines a supporting base for the operating member, the operating member being removably mounted on the supporting base of the supporting member.

7. The apparatus according to claim 4, comprising a plurality of operating members each of which defines a respective upper opening, which are alternatively mountable on the supporting member and which are interchangeable, each operating member of said plurality of operating members differentiating from the other operating members of said plurality of operating members at least as regards the shape and/or the size respectively of the housing and/or of the distancing space, and wherein when each operating member is mounted on the supporting member and the supporting element and the closing element are in the working position, the upper opening of that operating member is completely closed by the lower heating face.

8. The apparatus according to claim 1, wherein the supporting element also comprises a movement system which is associated with the cutting means for moving the cutting means between the raised position and the lowered position.

9. The apparatus according to claim 8, wherein the movement system comprises a first actuator, which is switchable between a first configuration and a second configuration, and connecting means, which mechanically connect the first actuator and the cutting means, said cutting means being in the lowered position when the first actuator is in the first configuration and being in the raised position when the first actuator is in the second configuration.

10. The apparatus according to claim 4, wherein the supporting element also comprises a movement system which is associated with the cutting means for moving the cutting means between the raised position and the lowered position and wherein the operating member also comprises the movement system.

11. The apparatus according to claim 1, wherein the cutting means project into the working chamber when the cutting means are in the raised position, and wherein the cutting means are outside the working chamber when the cutting means are in the lowered position.

12. The apparatus according to claim 1, wherein made between the housing portion and the distancing portion there are slits in which the cutting means are mounted.

13. The apparatus according to claim 1, also comprising a retaining device of the thermoformable film which is switchable between an opening configuration, in which in use it is uncoupled from the thermoformable film, and a closing configuration, in which in use it retains the thermoformable film interposed between the supporting element and the closing element, and wherein the retaining device of the thermoformable film is in the closing configuration at least when the supporting element and the closing element are moved from the working position to the home position.

14. The apparatus according to claim 13, wherein the retaining device comprises a first retaining element and a second retaining element which are movable at least one relative to the other between a spaced position, which corresponds to the opening configuration of the retaining device and in which they are spaced apart and uncoupled from each other, and a near position, which corresponds to the closing configuration of the retaining device and in which they are near and coupled to each other to lock the thermoformable film between them.

15. The apparatus according to claim 13, wherein the retaining device is fixed to the closing element.

16. The apparatus according to claim 1, configured to perform the skin packaging of a product, wherein:

the supporting element is configured to receive, in use, the support on which the product is positioned;

the lower heating face is configured to heat, in use, the thermoformable film to be applied on the support and the product; and the means for creating the vacuum are configured to generate the vacuum in the working chamber when the supporting element and the closing element are in the working position and to cause in use the thermoformable film to adhere to the support and to the product.

* * * * *